United States Patent
Xie et al.

(10) Patent No.: US 12,497,397 B2
(45) Date of Patent: Dec. 16, 2025

(54) PYRROLE COMPOUNDS USEFUL AS ANTIFUNGALS

(71) Applicant: WIGEN BIOMEDICINE TECHNOLOGY (SHANGHAI) CO., LTD., Shanghai (CN)

(72) Inventors: Yuli Xie, Shanghai (CN); Houxing Fan, Shanghai (CN); Lihui Qian, Shanghai (CN)

(73) Assignee: WIGEN BIOMEDICINE TECHNOLOGY (SHANGHAI) CO., LTD., Shanghai (CN)

( * ) Notice: Subject to any disclaimer, the term of this patent is extended or adjusted under 35 U.S.C. 154(b) by 957 days.

(21) Appl. No.: 17/640,812

(22) PCT Filed: Dec. 2, 2020

(86) PCT No.: PCT/CN2020/133236
§ 371 (c)(1),
(2) Date: Mar. 5, 2022

(87) PCT Pub. No.: WO2021/110010
PCT Pub. Date: Jun. 10, 2021

(65) Prior Publication Data
US 2022/0340565 A1    Oct. 27, 2022

(30) Foreign Application Priority Data
Dec. 3, 2019  (CN) .......................... 201911256772.0

(51) Int. Cl.
*C07D 471/04* (2006.01)
*C07D 498/04* (2006.01)

(52) U.S. Cl.
CPC ......... *C07D 471/04* (2013.01); *C07D 498/04* (2013.01)

(58) Field of Classification Search
None
See application file for complete search history.

(56) References Cited

FOREIGN PATENT DOCUMENTS

| | | |
|---|---|---|
| JP | 2008545647 A | 12/2008 |
| JP | 2010515666 A | 5/2010 |
| JP | 2010527979 A | 8/2010 |
| JP | 2011518818 A | 6/2011 |
| JP | 2011523948 A | 8/2011 |
| WO | 2006123145 A1 | 11/2006 |
| WO | 2008062182 A1 | 5/2008 |
| WO | 2008145963 A1 | 12/2008 |
| WO | 2009130481 A1 | 10/2009 |
| WO | 2009144473 A1 | 12/2009 |
| WO | 2018214812 A1 | 11/2018 |
| WO | WO-2022134837 A1 * | 6/2022 ............. A01N 43/90 |

* cited by examiner

*Primary Examiner* — John S Kenyon
*Assistant Examiner* — Sara Elizabeth Bell
(74) *Attorney, Agent, or Firm* — SZDC Law PC

(57) ABSTRACT

The invention relates to a series of new pyrrole compounds and preparation methods and uses thereof. Specifically, the present invention relates to compounds as shown in general formula (1) and the preparation method thereof, and the uses of the compound shown in general formula (1) and optical isomers, crystal forms and pharmaceutically acceptable salts in preparation of drugs for prevention or treatment of diseases related to fungal infection.

10 Claims, No Drawings

PYRROLE COMPOUNDS USEFUL AS ANTIFUNGALS

This application is the National Stage Application of PCT/CN2020/133236, filed on Dec. 2, 2020, which claims the benefits of Chinese patent application CN 201911256772.0, filed on Dec. 3, 2019, which is incorporated herein by reference in its entirety.

FIELD OF THE INVENTION

The present invention relates to the field of pharmaceutical chemistry. More specifically, it relates a series of new pyrrole compounds and preparation methods and uses thereof.

BACKGROUND OF THE INVENTION

Invasive fungal infections (IFIs) have become one of the most serious threat to human health, claiming over 1.5 million lives globally per year on average. Although fungal infection also will happen to healthy people, most fungal infections originate from immunocompromised patients, so the fungus-targeted antifungal drug is a primary mean for treating IFI. With the application of immunosuppressants, and increasing number of patients taking tumor radiotherapy and chemotherapy, intravenous placement and long-term ICU treatment, IFI is attracting increasing attentions due to its annually increasing morbidity and mortality. However, clinically common antifungal drugs are limited, mainly including azole, polyene, echinocandin and 5-fluorocytosine [Biochem Pharmacol, 2017, 133: 86-96.].

Azoles are the most commonly used antifungal drugs, which can be divided into imidazole and triazole according to the chemical structure. Imidazole drugs (miconazole, ketoconazole, etc.) were first developed with high antifungal activity, which are limited to external use due to their high toxicity. Triazole drugs were developed later, which can be administered in vivo to treat IFI, mainly by inhibiting 14-α lanosterol demethylase (CYP51) due to the cytochrome P450 enzyme dependence mechanism. Conversion of lanosterol in fungal membrane into ergosterol is inhibited, and the toxic sterol is accumulated in fungal cells, so that the growth and replication of fungi are inhibited. The main problems of azole drugs are drug resistance and their inhibition on homologous enzymes (CYP3A4, CYP2C9, etc.) of CYP51 in the human body. They tend to cause drug interaction with several drugs. Polyene drugs are only effective for fungi with sterol in the outer membranes, and the exact antifungal mechanism thereof is still unclear. Among polyene drugs, amphotericin B is the most effective anti-IFI drug so far, but it has severe toxic and side effects such as fever, chills, and nephrotoxicity [Med Mycol, 2017, 55(1):118-124]. Echinocandin compounds inhibit synthesis of cell wall by inhibiting β-glucan. Only three echinocandin drugs, i.e., caspofungin, micafungin and anidulafungin, are clinically used, which have narrow antibacterial spectra, and are ineffective against Cryptococci, hard to be absorbed by gastrointestinal tract and only can be administered intravenously once a day to maintain the drug concentration in vivo. Furthermore, the occurrence of echinocandin-resistant fungi due to genetic mutation also limits uses of such drugs [Lancet, 2003, 362(9390): 1142-1151.]. 5-Fluorocytosine is an analogue of pyrimidine, one of the major components of RNA and DNA, which inhibits cell growth mainly by interfering with intracellular pyrimidine metabolism and synthesis of DNA, RNA, and protein. In addition to the four major antibacterial drugs mentioned above, a series of new pyrrole compounds with relatively high antifungal activity are also disclosed in WO2009/130481.

Therefore, medical treatment is the key strategy for IFI. However, limited drug varieties and increasingly serious drug resistance, toxic and side effects make the demand on development of new antifungal drugs become even more urgent, so new antifungal drugs are needed urgently for clinic use to bring positive therapeutic effects to patients.

SUMMARY OF INVENTION

The present invention provides a series of compounds with a structure shown as formula (1) or optical isomers, crystal forms, pharmaceutically acceptable salts, hydrates or solvates thereof:

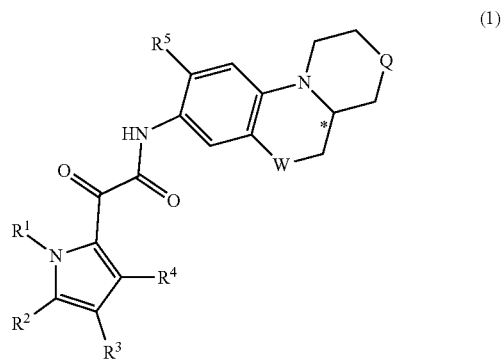

(1)

Wherein,
"*" is a chiral center;
$R^1$ is H, C1-C6 alkyl, (C1-C3)alkoxyl-(C2-C3)alkyl-, (C3-C6)cycloalkyl-(C1-C3)alkyl-, C3-C6 cycloalkyl or halogenated C1-C6 alkyl;
$R^2$ is H, C1-C3 alkyl or C3-C6 cycloalkyl;
$R^3$ is H or halogen;
$R^4$ is H, halogen, C1-C3 alkyl, C3-C6 cycloalkyl, aryl or heteroaryl, wherein the aryl or heteroaryl are optionally substituted by 1-3 following substituents: Halogen, C1-C3 alkyl, C3-C6 cycloalkyl, C1-C3 alkoxyl, halogenated C1-C3 alkyl or halogenated C1-C3 alkoxyl; when substituted by several substituents, the substituents may be the same or different;
$R^5$ is H, Me, OMe or halogen;
W is —O— or —$NR^6$—, wherein $R^6$ is H, C1-C3 alkyl or C3-C6 cycloalkyl;
Q is —O— or —$NR^7$—, wherein $R^7$ is H, C1-C3 alkyl, C3-C6 cycloalkyl, (C3-C6)cycloalkyl-(C1-C3)alkyl-, heterocycloalkyl, aryl or heteroaryl, wherein the aryl or heteroaryl are optionally substituted by 1-3 following radicals: Halogen, C1-C3 alkyl, C3-C6 cycloalkyl, C1-C3 alkoxyl, halogenated C1-C3 alkyl or halogenated C1-C3 alkoxyl; when substituted by several substituents, said substituents may be identical or different;
In another embodiment, in Formula (1), $R^1$ is H, Me, Et, $^n$-Pr, $^i$-Pr, $^t$-Bu, —$CH_2CH_2OMe$,

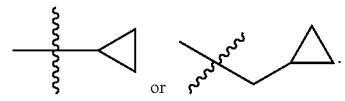

In another embodiment, in Formula (1), $R^2$ is H, Me, Et or

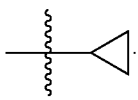 [SMILES: *C1CC1]

In another embodiment, in Formula (1), $R^3$ is H or F.
In another embodiment, in Formula (1), $R^4$ is

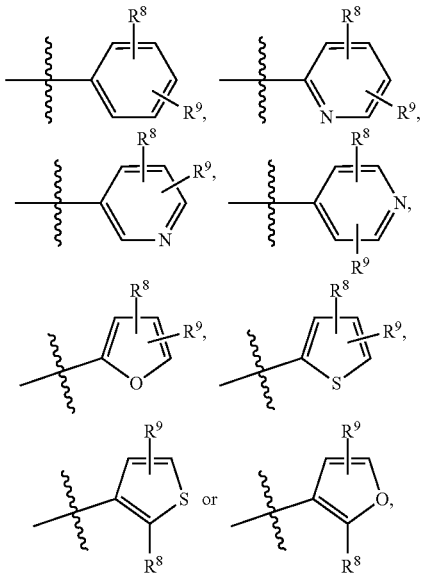

wherein $R^8$ and $R^9$ are independently H, halogen, C1-C3 alkyl, C3-C6 cycloalkyl, C1-C3 alkoxyl, halogenated C1-C3 alkyl or halogenated C1-C3 alkoxyl.

In another embodiment, in Formula (1), $R^5$ is H, F, Cl or OMe.

In another embodiment, in Formula (1), W is —O— or —NMe—.

In another embodiments, in Formula (1), Q is —O— or —$NR^7$—, wherein $R^7$ is H, Me, Et, $^n$-Pr, $^i$-Pr, $^t$-Bu, $^i$-Bu,

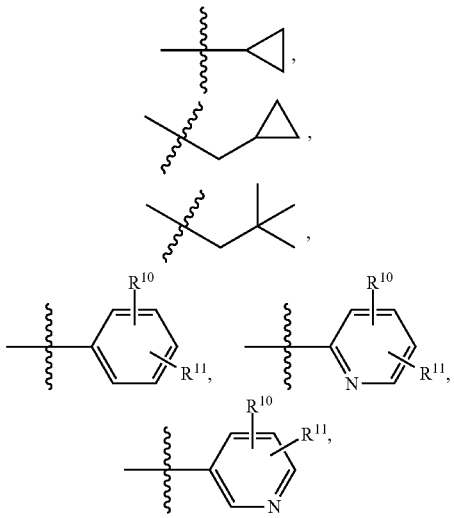

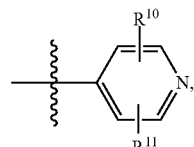

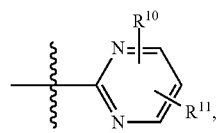

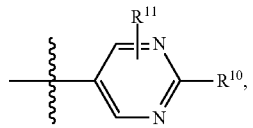

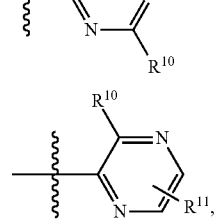

and $R^{10}$ and $R^{11}$ independently are H, halogen, C1-C3 alkyl, C3-C6 cycloalkyl, C1-C3 alkoxyl, halogenated C1-C3 alkyl or halogenated C1-C3 alkoxyl.

In some embodiments of the present invention, above-mentioned compounds, isomers or pharmaceutically acceptable salts, are:

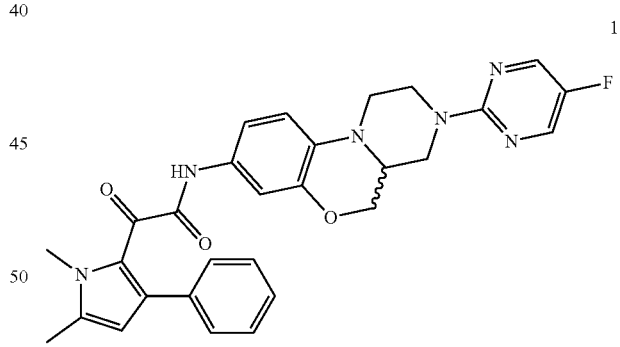

1

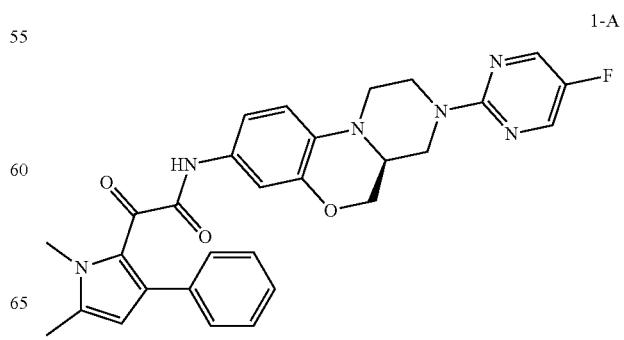

1-A

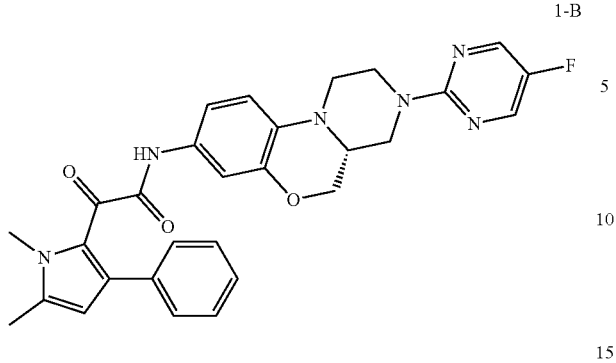
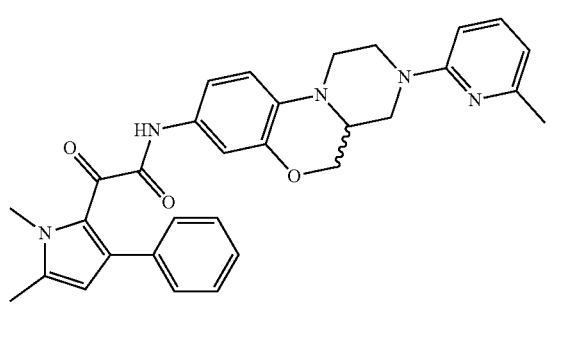
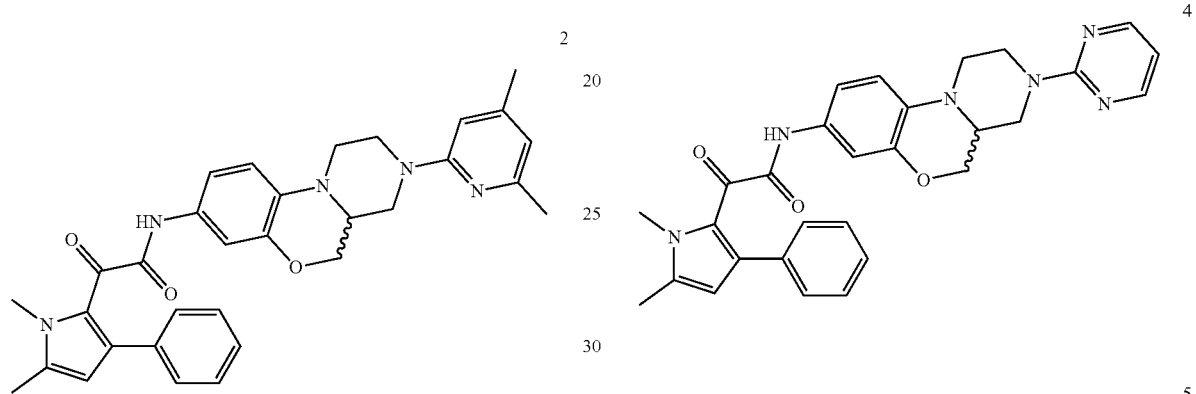
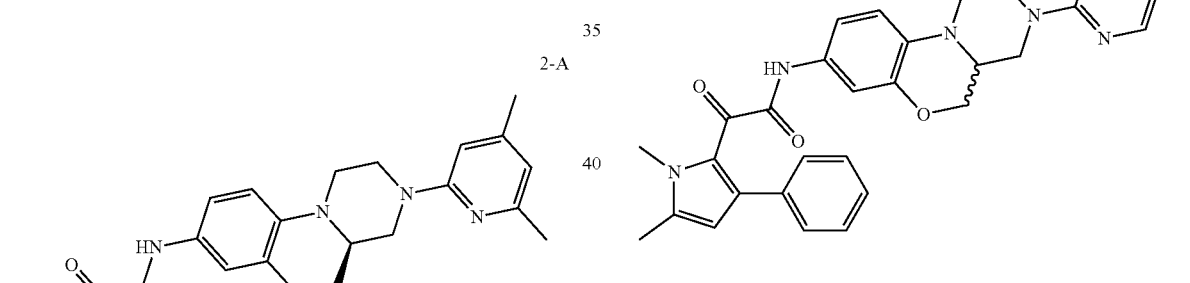
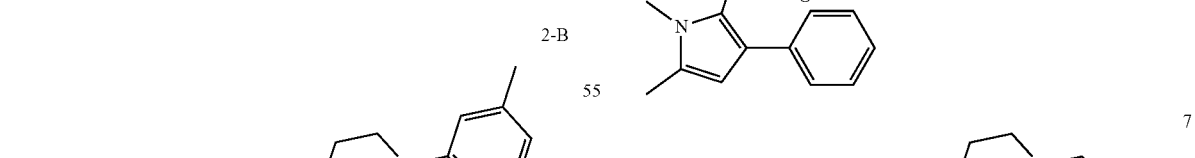
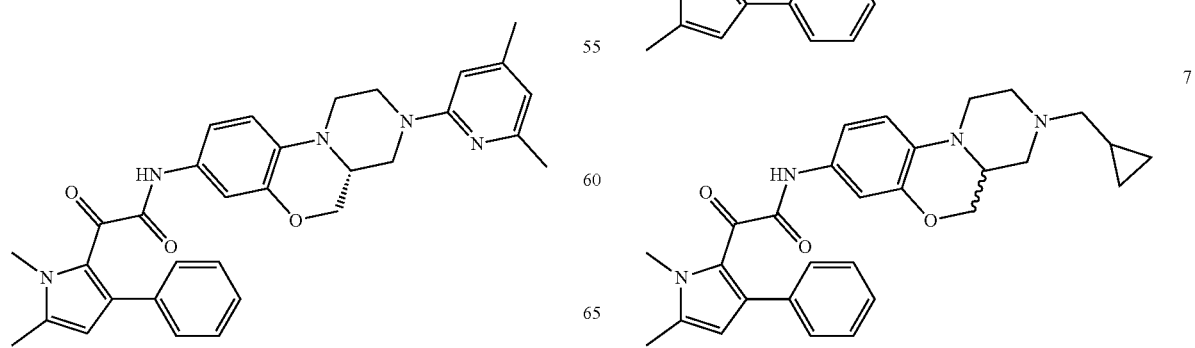

8
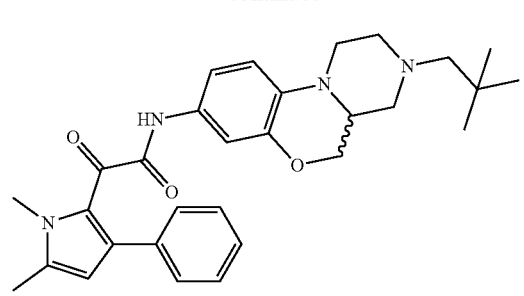
9
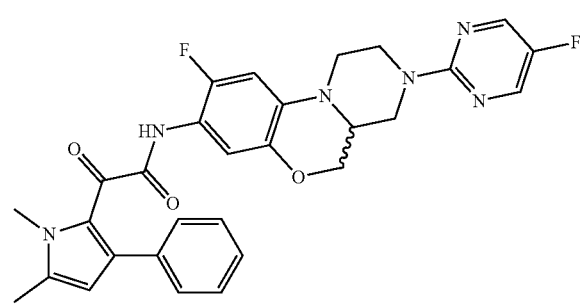
10
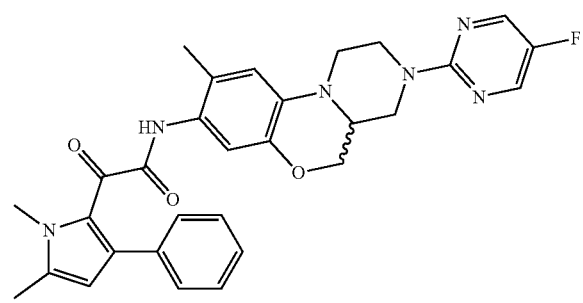
11
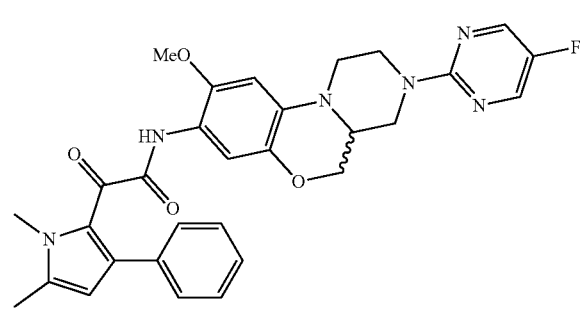
12
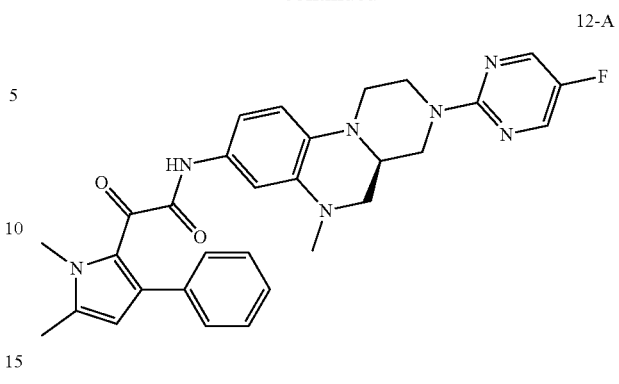
12-A
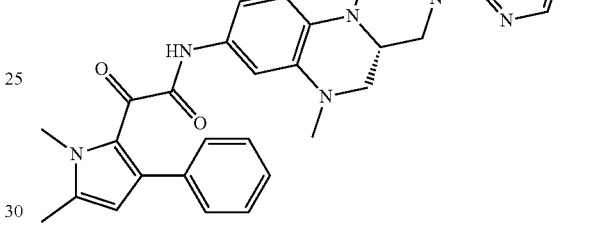
12-B
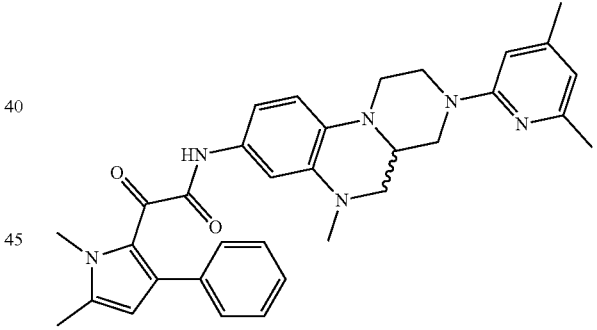
13
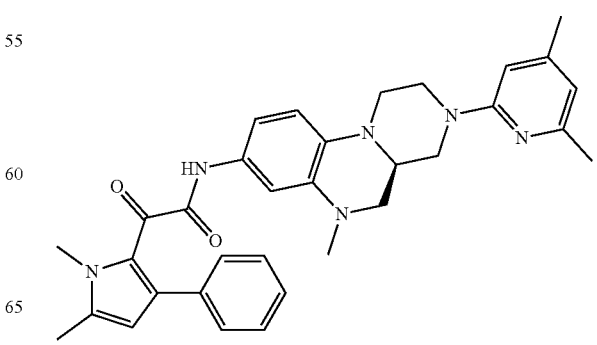
13-A
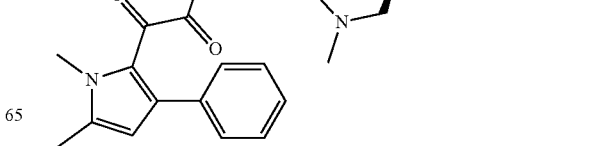

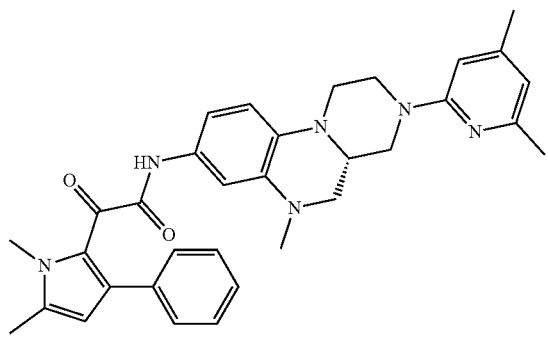

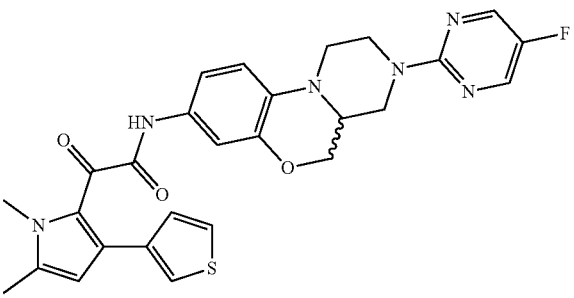

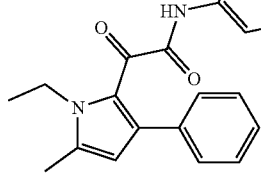

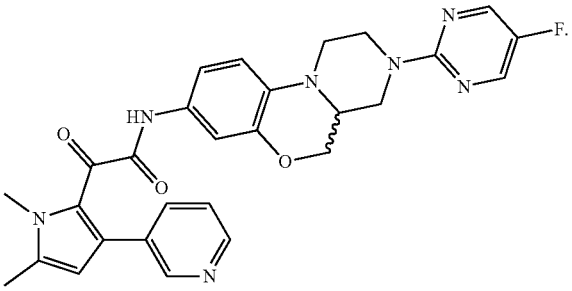

Another purpose of the present invention is to provide a pharmaceutical composition comprising a pharmaceutically acceptable excipient or carrier, and a compound of formula (1), or its optical isomer, crystal form, pharmaceutically acceptable salt, hydrate or solvate thereof, herein as active pharmaceutical ingredient.

Another purpose of the present invention is to provide uses of the compounds, or optical isomer, pharmaceutically acceptable inorganic or organic salts thereof for treatment of fungal infection and related diseases.

It should be understood that the above general descriptions and the following detailed descriptions of the present invention are exemplary and illustrative, in order to provide further descriptions on claims of the present invention.

DEFINITION AND DESCRIPTION

Unless otherwise specified, the following terms and phrases used herein are intended to have meanings shown as follows. A specific term or phrase should not be considered indefinite or unclear in the absence of a specific definition, while it should be understood in accordance with the ordinary definition. Product name appearing herein is intended to refer to the corresponding product or its active pharmaceutical ingredient. The term "pharmaceutically acceptable" adopted herein means that for those compounds, combinations and/or preparations, within the scope of reliable pharmaceutical judgment, which are applicable for exposure to human and animal tissues, free of excessive toxicity, irritation, allergic reaction or other problems or complications, and commensurate to a reasonable benefit/risk ratio.

The term "pharmaceutically acceptable salt" refers to an existence form of compound, which will neither cause major irritation to administration organism nor make bioactivity and properties of the compound disappear. In some specific aspects, pharmaceutically acceptable salts are obtained by the reaction of compounds in formula (1) with acid, e.g. hydrochloric acid, hydrobromic acid, hydrofluoric acid, sulfuric acid, phosphoric acid, nitric acid, phosphoric acid and other inorganic acids, formic acid, acetic acid, propionic acid, oxalic acid, trifluoroacetic acid, malonic acid, succinic acid, fumaric acid, maleic acid, lactic acid, malic acid, tartaric acid, citric acid, picric acid, methanesulfonic acid, benzenesulfonic acid, p-toluenesulfonic acid and other organic acids, as well as aspartic acid, glutamic acid and other acidic amino acids.

It should be understood that reference for pharmaceutically acceptable salts include solvent addition form or crystal form, especially solvate or polymorph. Solvates contain stoichiometric or non-stoichiometric solvent and are selectively formed during crystallization with pharmaceutically acceptable solvent, e.g., water, ethanol, etc. Hydrate is formed when the solvent is water, and alcoholate is formed when the solvent is ethanol. It is convenient to prepare or form solvates of the compounds in formula (1) by methods specified herein. For example, it is convenient to prepare hydrate of the compounds in formula (1) by recrystallization in mixed solvent of water/organic solvent, with organic solvent in use including but not limited to acetonitrile, tetrahydrofuran, ethanol or methanol. Besides that, compounds mentioned herein can exist in both non-solvated and solvated forms. In a word, for compounds and methods provided herein, solvated form is considered equivalent to non-solvated form.

In other specific examples, the compounds in formula (1) are prepared into different forms including but not limited to amorphous, crushed and nanoparticle forms. Besides, the compounds in formula (1) include crystal form, and may have polymorphs. Polymorphs include different lattice arrangements of compound in the same elemental composition. Polymorphs are normally different in X-ray diffraction pattern, infrared spectroscopy, melting point, density, hardness, crystal form, optical and electrical properties, stability and solubility. Different factors such as recrystallization solvent, crystallization speed and storage temperature may cause domination of a single crystal form.

In another aspect, the compounds in formula (1) may have one or several stereo centers, so that they may appear in the form of racemate, racemic mixture, single enantiomer, diastereoisomer or single diastereomer. Asymmetric center may exist, depending on properties of each substituent on molecule. Each such asymmetric center will independently generate two optical isomers, and all possible mixtures of optical isomers and diastereomers as well as pure or partially pure compounds are within the scope of the present invention. The present invention includes all such isomeric forms of these compounds.

Unless otherwise specified, the absolute configuration of a stereo center is expressed by a wedge bond (╱) and a dashed bond (⋯), and the wedge bond or dashed bond (⋯ or ╱) is expressed by a wave line (∿).

Compounds specified in the present invention may contain atomic isotope in unnatural proportion at one or several atoms which compose such compound. For example, it is possible to use radioactive isotopes to mark compound, such as tritium ($^3H$), I-125 ($^{125}I$) or C-14 ($^{14}C$). All isotopic compositions of compounds specified in the present invention are within the scope of the present invention, regardless of whether they are radioactive or not.

Compounds specified in the present invention and pharmaceutically acceptable salts thereof can be prepared into various preparations, including pharmacologically acceptable excipients or carriers for compounds specified in the present invention and pharmaceutically acceptable salts thereof in a safe and effective amount range. Wherein "safe and effective amount" means: the amount of the compound is enough to significantly improve patient's conditions without causing serious side effects. Said safe and effective amount of the compound is determined by age, conditions, and treatment course and other specific conditions of patients.

"Pharmacologically acceptable excipient or carrier" means: One or several compatible solid or liquid fillers or gel substances which are applicable for human use and must have sufficient purity and low enough toxicity. The pharmacologically acceptable excipient or carrier includes cellulose and its derivatives (e.g., sodium carboxymethyl cellulose, sodium ethyl cellulose, cellulose acetate, etc.), gelatin, talc, lubricating solid (e.g., stearic acid, magnesium stearate), calcium sulfate, vegetable oil (e.g., soybean oil, sesame oil, peanut oil, olive oil, etc.), polyol (e.g., propylene glycol, glycerol, mannitol, sorbitol, etc.), emulsifier (e.g. Tween®), wetting agent (e.g. sodium dodecyl sulfate), coloring agent, flavoring agent, stabilizer, antioxidant, preservative, pyrogen-free water, etc.

Compounds specified in the present invention can be administered orally, rectally, parenterally (intravenously, intramuscularly, or subcutaneously), or topically.

Unless otherwise specified, the term "alkyl" indicates saturated aliphatic radical which contains C1-C6 linear chain and branched chain. C1-C4 lower alkyl, e.g., methyl, ethyl, propyl, 2-propyl, n-butyl, isobutyl, tert-butyl, is preferred. As used herein, "alkyl" includes unsubstituted and substituted alkyl, especially alkyl substituted by one or several halogen atoms. Preferred alkyl is $CH_3$, $CH_3CH_2$, $CF_3$, $CHF_2$, $CH_3CH_2$, $^iPr$, $^nPr$, $^iBu$, $^nBu$ or $^tBu$.

"Cycloalkyl" refers to C3-C6 all-carbon single ring aliphatic radical, C6-C12 dual ring aliphatic radical, C6-C12 bridged ring aliphatic radical or C6-C12 spiral ring aliphatic radical, wherein one or several rings may contain one or several double bonds, but none of them has a completely conjugated π electron system. For example, cyclopropyl, cyclobutyl, cyclopentyl, cyclohexane, cyclohexadiene, etc.

"Alkoxyl" refers to alkyl-O— radical, which is bonded to the matrix by oxygen. (C1-C3) alkoxyl-(C2-C3) alkyl- is a radical formed by connection of (C1-C3) alkoxyl with -(C2-C3) alkyl, which is bonded to the matrix by (C2-C3) alkyl. (C3-C6) cycloalkyl-(C1-C3) alkyl- is a radical formed by connection of (C3-C6) cycloalkyl with (C2-C3) alkyl, and bonded to the matrix by (C1-C3) alkyl.

"Aryl" refers to aromatic monocyclic or polycyclic system. Preferred aryl includes but not limited to phenyl. "Heteroaryl" refers to aromatic monocyclic or polycyclic radical which contains one or several annular atoms. Preferred C5-C10 heteroaryl includes but not limited to pyridinyl, pyrazinyl, furyl, thienyl, pyrimidinyl, pyridone, oxazolyl, isothiazolyl, oxazolyl, oxadiazolyl, thiazolyl, thiadiazolyl, pyrazolyl, furazanyl, pyrrolyl, triazolyl, 1,2,4-thiadiazolyl, pyridazinyl, quinoxalinyl, phthalazinyl, hydroxyindolyl, imidazo [1, 2-a]pyridinyl, imidazo [2,1-b] thiazolyl, benzofurazanyl, indolyl, azaindolyl, benzimidazolyl, benzothienyl, quinolinyl, imidazolyl, thienopyridinyl, quinazolinyl, thienopyrimidinyl, pyrrolopyridinyl, imidazolopyridine, isoquinolinyl, benzoacrazinyl, 1,2,4-triazinyl, benzo Thiazolyl and oxides thereof.

Unless otherwise specified, the term "heterocycloalkyl" refers to saturated or partially saturated nonaromatic cyclic radical composed of carbon atoms and heteroatoms nitrogen, oxygen or sulfur. Such cyclic radical may be monocyclic or polycyclic radical. In the present invention, number of heteroatoms in heterocycloalkyl is preferably 1, 2, 3 or 4, and nitrogen, carbon or sulfur atoms in heterocycloalkyl can be artificially oxidized. Nitrogen atoms can be optionally substituted by other radicals to form tertiary amine or quaternary ammonium salt. Example of heterocycloalkyl includes but not limited to: aziridinyl, azetidin-1-yl, N-alkylazetidin-3-yl, tetrahydrofuran-2yl, tetrahydrofuran-3-yl, morpholin-4-yl, thiomorpholin-4-yl, thiomorpholin-S-oxide-4-yl, piperidin-1-yl, N-alkylpiperidin-4-yl, pyrrolidin-1-yl, N-alkylpyrrolidin-2-yl, piperazin-1-yl, 4-alkylpiperazin-1-yl, etc.

Unless otherwise specified, the term "halogenated" or "halogen" itself or as a part of another substituent, refers to fluorine, chlorine, bromine or iodine atoms Besides that, "halogenated alkyl" is intended to include monohalogenated alkyl or polyhalogenated alkyl. For example, "halogenated C1-C3 alkyl" is intended to include but not limited to, trifluoromethyl, 2,2,2-trifluoroethyl, 2-chloropropyl and 3-bromopropyl, etc.

The term "membered ring" includes any ring structure. The term "membered" means number of skeleton atoms which compose the ring. For example, cyclohexyl, pyridinyl, pyranyl, and thiopyranyl are six-membered rings, and cyclopentyl, pyrrolyl, furyl, and thienyl are five-membered rings.

The term "fragment" refers to a specific part or functional group of molecule. Chemical fragments are usually considered as chemical entities included or adsorbed in molecule.

Preparation of Compounds

Methods of preparing compounds in formula (1) are described in detail hereinafter, but these specific methods do not constitute any limitation to the present invention.

Compounds in formula (1), as described above, can be synthesized by combining standard synthesis technologies or well-known technologies with technologies herein. Besides that, solvent, temperature and other reaction conditions mentioned herein can be changed. Start raw materials used to synthesize compounds listed in Table 1 can be synthesized or obtained from commercial sources, e.g., but not limited to Aldrich Chemical Co. (Milwaukee, Wis.) or Sigma Chemical Co. (St. Louis, Mo.). Compounds specified herein and other related compounds which have different substituents can be synthesized by well-known technologies and raw materials, including methods found by March, Advanced Organic Chemistry $4^{th}$ Ed. (Wiley 1992); Carey and Sundberg, Advanced Organic Chemistry $4^{th}$Ed., Vols. A and B (Plenum 2000, 2001), Green and Wuts, Protective Groups in Organic Synthesis $3^{rd}$ Ed., (Wiley 1999). General preparation method of the compounds can be varied by using appropriate reagents and introducing different radicals into the molecular formulas provided herein.

In one aspect, compounds specified herein are prepared by well-known methods in the process. However, conditions of method, e.g., reactants, solvents, alkali, amount of compound in use, reaction temperature, reaction time, etc. are not limited by the following explanation. Compounds specified in the present invention also can be conveniently prepared by optionally combining various synthesis methods described in this specification or known in this field, and such combination is easy for technicians of the field to which the present invention belongs to implement. On the one hand, the present invention also provides a method of said compounds in formula (1), which is described hereinafter as Method A:

Method A includes the following steps: First of all, compound A1 reacts with compound A2 under alkaline condition to form compound A3, and compound A3 is further converted into compound A4 under the effect of strong alkali. Then protective group is removed from compound A4 to form compound A5, and compound A5 reacts with appropriate raw material to form compound A7. Finally compound A7 reacts with compound A8 to form the target compound A9.

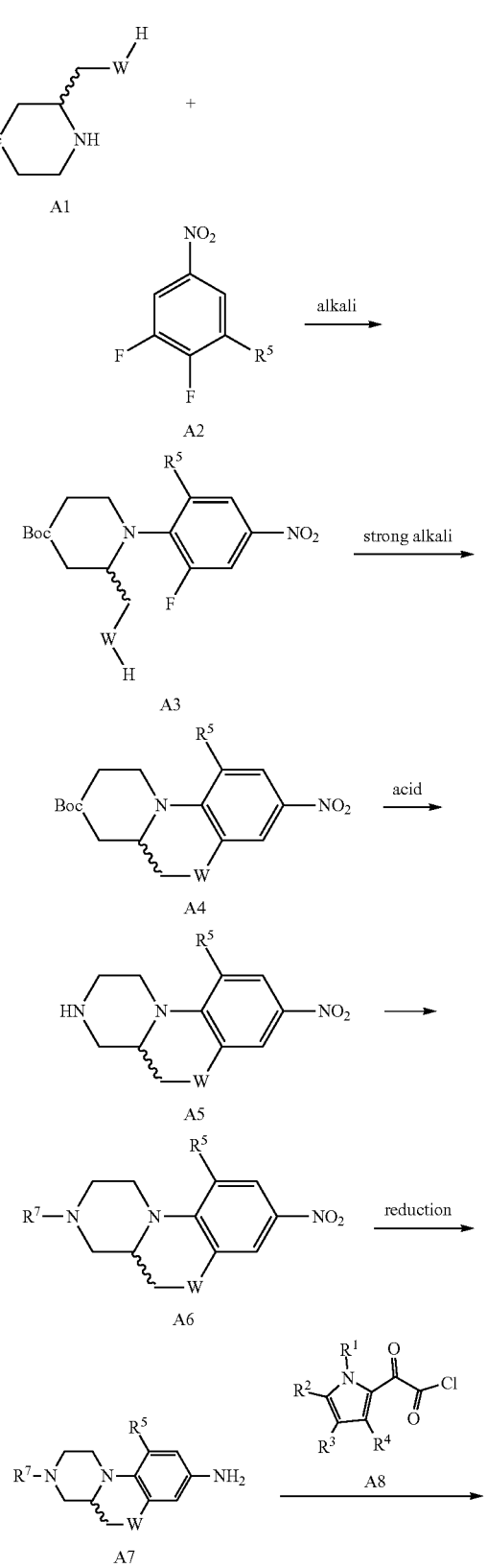

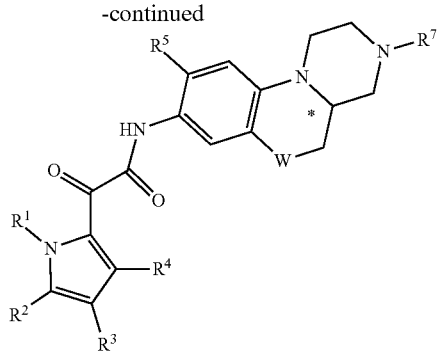

A9

In the above reaction, W, $R^1$, $R^2$, $R^3$, $R^4$, $R^5$ and $R^7$ are as defined above.

Above characteristics mentioned in the present invention, or characteristics mentioned in the example, can be combined randomly. All characteristics disclosed by this specification can be used in combination with any combination form, and each characteristic disclosed by this specification can be replaced by any alternative characteristic provided in the same, equal or similar purpose. Therefore, unless otherwise specified, disclosed characteristic is only a general example for equal or similar characteristic.

All specific aspects, characteristics and advantages of compounds, methods and drug combinations mentioned above will be elaborated in detail in the following descriptions to make contents of the present invention become clear. It should be understood herein that the following detailed descriptions and examples describe specific examples which are only used for reference. After reading description contents of the present invention, a technician of this field can make various alterations or modifications to the present invention, and these equivalent situations are also within the scope limited by this application.

For all examples, $^1$H-NMR is recorded by Vian Mercury 400 NMR spectrometer, and chemical shift is expressed in δ (ppm); if not specified, silica gel for separation is 200-300, and eluent proportion is in volumetric ratio.

The following abbreviations are used in the present invention: ACN is acetonitrile; Ar is argon; $CDCl_3$ is deuterated chloroform; $CD_3OD$ is deuterated methanol; $(COCl)_2$ is oxalyl chloride; DCM is dichloromethane; DIPEA is diisopropylethylamine; Diox or Dioxane is 1,4-dioxane; DMF is dimethylformamide; DMSO is dimethyl sulfoxide; EA or EtOAc is ethyl acetate; EtOH is ethanol; h is hour; $H_2$ is hydrogen; HOAc is acetic acid; $K_2CO_3$ is potassium carbonate; KI is potassium iodide; $K_3PO_4$ is potassium phosphate; LC-MS is liquid phase chromatography-mass spectrometry; LiOH is lithium hydroxide; mL is milliliter; MeOH is methanol; $MgCl_2$ is magnesium chloride; min is minute; MS is mass spectrometry; $NaBH(OAc)_3$ is sodium triacetoxyborohydride; NaH is sodium hydride; $NaNO_2$ is sodium nitrite; $Na_2SO_4$ is sodium sulfate; NMR is nuclear magnetic resonance; $Pd_2(dba)_3$ is tris(dibenzylideneacetone)-dipalladium; PE is petroleum ether; $SOCl_2$ is dichlorosulfoxide; $^t$BuONa is sodium tert-butoxide; TEA is triethylamine; THF is tetrahydrofuran; Toluene is toluene; TsCl is p-toluenesulfonyl chloride; Xantphos is 4,5-bis(diphenylphosphino)-9,9-dimethylxanthene;

SPECIFIC EXAMPLES

Example 1: Compound 1

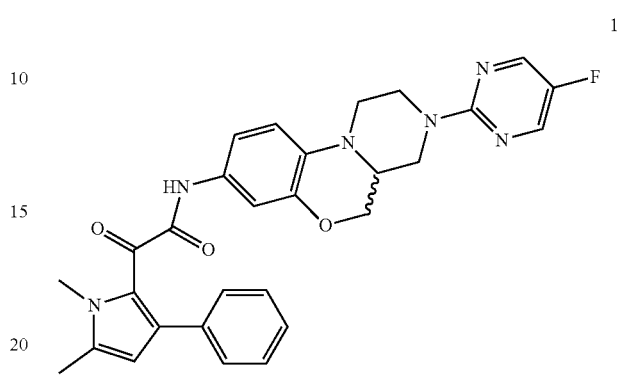

Synthesis Route

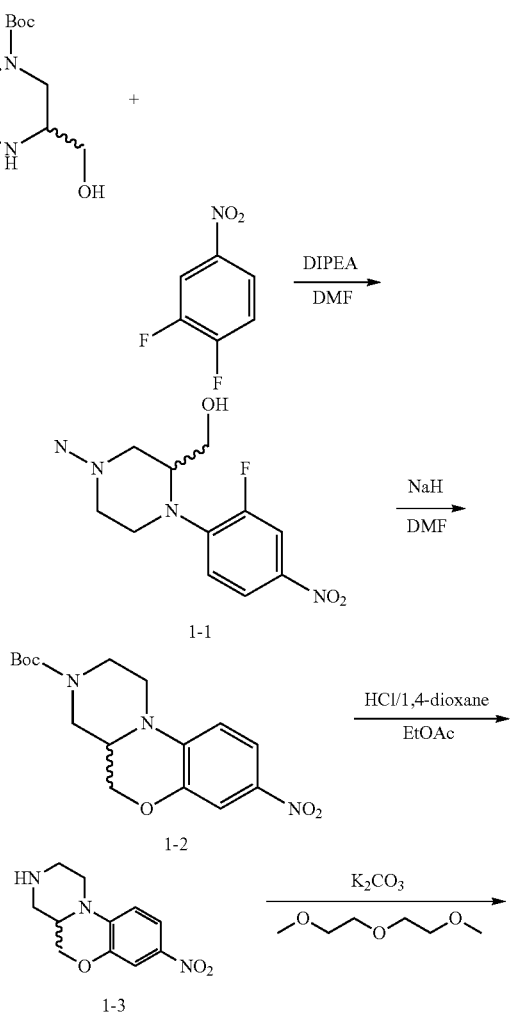

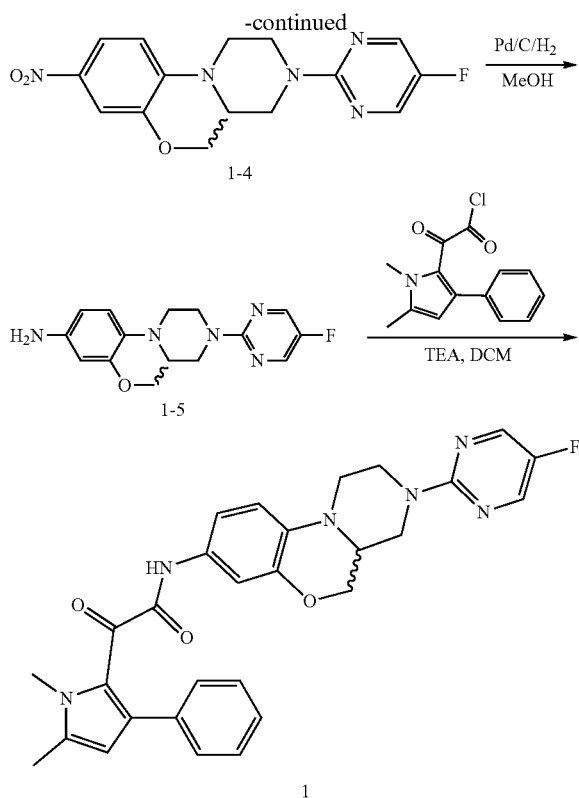

Step 1: Preparation of Compound 1-1

Tert-butyl 3-hydroxymethylpiperazine-1-formate (1.0 g, 4.63 mmol) and 1,2-difluoro-4-nitrobenzene (809 mg, 5.1 mmol) are dissolved into DMF (20 mL). The solution is added with DIPEA (1.8 g, 13.89 mmol) and heated to 120° C. to react overnight; after reaction is finished as monitored by LC-MS, reaction system is added with water (100 mL) and extracted with EA (50 mL*2); then organic phase is combined and rinsed with saturated salt water (50 mL) and dried by anhydrous $Na_2SO_4$, before the filtrate is concentrated and the residue is processed by column chromatography (PE/EA=10/1 to 5/1), and the yellow solid compound (600 mg, yield 60%) is obtained, ESI-MS m/z: 356.1 $[M+H]^+$.

Step 2: Preparation of Compound 1-2

Compound 1-1 (3.6 g, 10 mmol) is dissolved into DMF (30 mL), and the solution is added with NaH (60% content, 440 mg, 11 mmol) in an ice salt bath. The reaction is heated to 80° C. overnight; after the reaction is finished as monitored by LC-MS, reaction solution is cooled, poured into ice water (100 mL) and extracted with EA (50 mL*2); then the organic phase is combined, successively rinsed with water (150 mL*2) and saturated salt water (50 mL), and dried by anhydrous $Na_2SO_4$, before the filtrate is concentrated and the residue is processed by column chromatography (PE/EA=20/1 to 10/1), and the yellow solid compound (2.1 g, yield 62%) is obtained, ESI-MS m/z: 336.1 $[M+H]^+$.

Step 3: Preparation of Compound 1-3

Compound 1-2 (2.0 g, 6.0 mmol) is dissolved into EA (40 mL). The solution is added with HCl/dioxane solution (4.0 M, 10 mL), and stirred at room temperature for 3 h; after the reaction is finished as monitored by LC-MS, the reaction solution is directly concentrated, and the yellow solid crude product (2.0 g, yield 100%) is obtained and is directly used in the next reaction without purification, ESI-MS m/z: 236.1 $[M+H]^+$.

Step 4: Synthesis of Compound 1-4

The crude product 1-3 (2.0 g, 6.0 mmol) obtained in the previous step is suspended in diethylene glycol dimethyl ether (20 mL). The solution is added with 2-chloro-5-fluoropyrimidine (875 mg, 6.6 mmol) and anhydrous $K_2CO_3$ (4.15 g, 30 mmol), and heated to 100° C. to react for 6 h; after the reaction is finished as monitored by LC-MS, the reaction solution is cooled and filtered, then the obtained filter cake is pulped with cold water (10 mL) and the solution is filtered, the obtained filter cake is rinsed successively with water and PE and dried, and then the yellow solid is obtained (1.6 g, yield 80%), ESI-MS m/z: 332.1 $[M+H]^+$.

Step 5: Preparation of Compound 1-5

The crude product 1-4 (1.6 g, 4.8 mmol) obtained in the previous step is dissolved into MeOH (20 mL). The solution is added with Pd/C (10%, 200 mg) to react at room temperature overnight; after the reaction is finished as monitored by LC-MS, the reaction solution is filtered and the filtrate is concentrated, and the light yellow solid (1.1 g, yield 79%) is obtained, ESI-MS m/z: 302.1 $[M+H]^+$.

Step 6: Preparation of Compound 1

The crude product 1-5 (300 mg, 1 mmol) obtained in the previous step is dissolved into DCM (20 mL). The solution is added with TEA (202 mg, 2.0 mmol) and cooled to 0° C. by ice salt bath under the protection of Ar, before DCM solution of 2-(1,5-dimethyl-3-phenyl-1H-pyrrol-2-yl)-2-oxoacetyl chloride (see WO2009130481 for how to synthesize it, 314 mg, 1.2 mmol) is dropped and reaction is carried out at room temperature for 30 min; after the reaction is finished as monitored by LC-MS, the reaction solution is added with ice water to quench reaction and separated, then the water phase is extracted with DCM (20 mL*2), while the organic phase is combined, dried by anhydrous $Na_2SO_4$ and filtered, before the filtrate is concentrated and residue is purified by column chromatography (DCM/MeOH=100/1 to 20/1), and the light yellow solid (260 mg, yield 49%) is obtained.

$^1$H NMR (400 MHz, DMSO-$d_6$) δ: 10.25 (s, 1H), 8.79 (s, 2H), 7.55-7.43 (m, 5H), 7.17-7.08 (m, 2H), 6.79 (d, J=8.9 Hz, 1H), 6.32 (s, 1H), 4.58 (dd, J=12.1, 1.5 Hz, 1H), 4.21 (d, J=11.5 Hz, 1H), 3.87 (t, J=9.8 Hz, 1H), 3.78 (s, 3H), 3.64 (d, J=11.6 Hz, 1H), 2.96 (t, J=9.9 Hz, 1H), 2.79 (d, J=12.1, 2H), 2.61-2.51 (m, 2H), 2.19 (s, 3H); ESI-MS m/z: 527.2 $[M+H]^+$.

Through different chiral raw materials or chiral separation methods, two optical isomers of compound 1 are obtained, with structural formulas shown as follows:

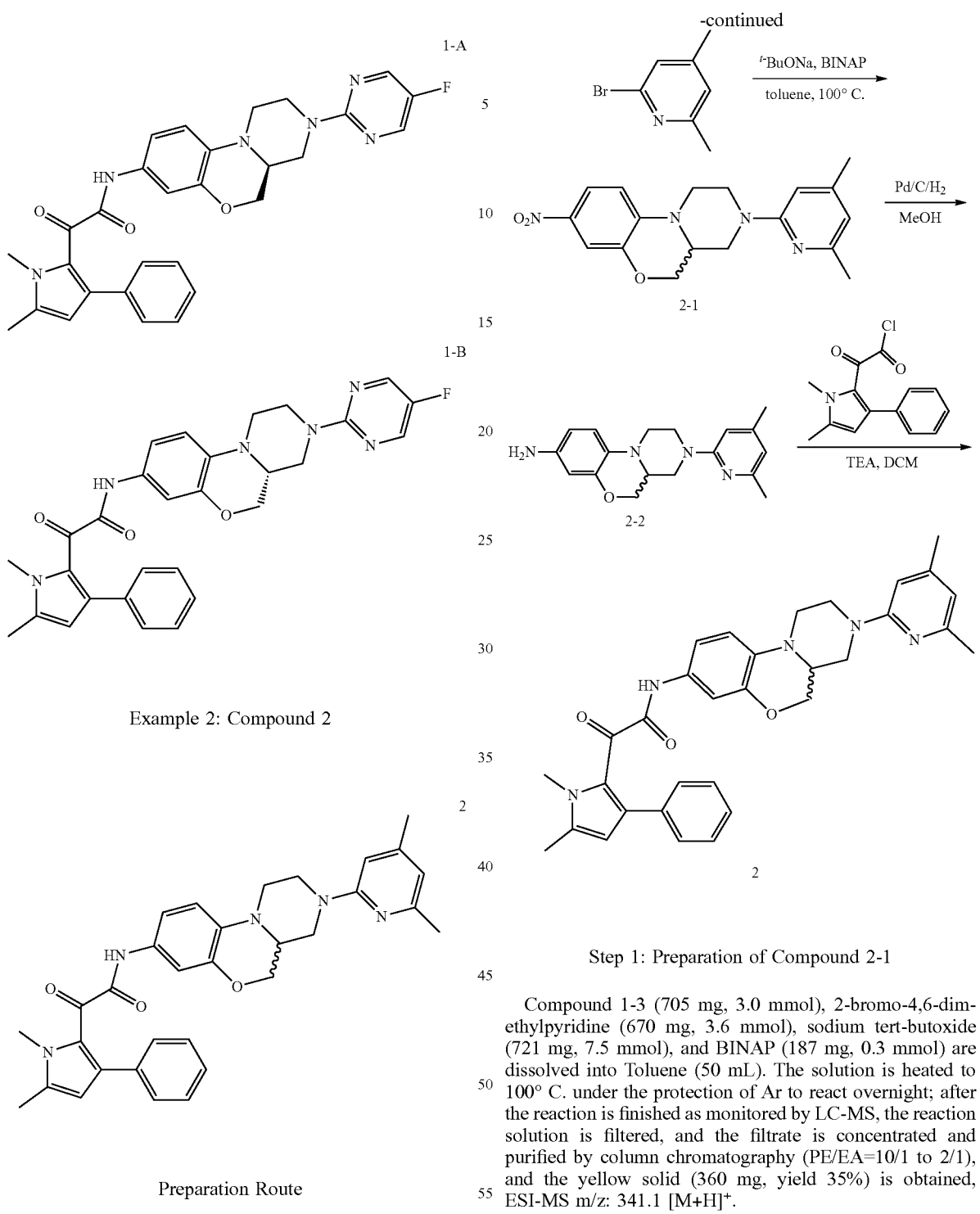

Example 2: Compound 2

Preparation Route

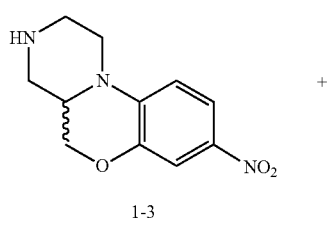

Step 1: Preparation of Compound 2-1

Compound 1-3 (705 mg, 3.0 mmol), 2-bromo-4,6-dimethylpyridine (670 mg, 3.6 mmol), sodium tert-butoxide (721 mg, 7.5 mmol), and BINAP (187 mg, 0.3 mmol) are dissolved into Toluene (50 mL). The solution is heated to 100° C. under the protection of Ar to react overnight; after the reaction is finished as monitored by LC-MS, the reaction solution is filtered, and the filtrate is concentrated and purified by column chromatography (PE/EA=10/1 to 2/1), and the yellow solid (360 mg, yield 35%) is obtained, ESI-MS m/z: 341.1 [M+H]$^+$.

Step 2: Preparation of Compound 2-2

The crude product 2-1 (360 mg, 1.06 mmol) obtained in the previous step is dissolved into MeOH (20 mL). The solution is added with Pd/C (10%, 50 mg) and introduced with H$_2$ to react at room temperature overnight; after the reaction is finished as monitored by LC-MS, the reaction solution is filtered, and the filtrate is concentrated, and the light yellow solid crude product (270 mg, yield 82%) is obtained, ESI-MS m/z: 311.1 [M+H]$^+$.

Step 3: Preparation of Compound 2

The crude product 2-2 (250 mg, 0.8 mmol) obtained in the previous step is dissolved into DCM (20 mL). The solution is added with TEA (162 mg, 1.6 mmol) and cooled to 0° C. by ice salt bath under the protection of Ar, before DCM solution of 2-(1,5-dimethyl-3-phenyl-1H-pyrrol-2-yl)-2-oxoacetyl chloride (see WO2009130481 for how to synthesize it, 261 mg, 1 mmol) is dropped and reaction is carried out at room temperature for 30 min; after the reaction is finished as monitored by LC-MS, the reaction solution is added with ice water to quench reaction and separated, then the water phase is extracted with DCM (20 mL*2), while the organic phase is combined, dried by anhydrous $Na_2SO_4$ and filtered, before the filtrate is concentrated and the residue is purified by column chromatography ($CH_2Cl_2$/MeOH=100/1 to 20/1), and the light yellow solid (160 mg, yield 37%) is obtained.

$^1$H NMR (400 MHz, DMSO-$d_6$) δ: 10.20 (s, 1H), 7.54-7.42 (m, 5H), 7.16-7.06 (m, 2H), 6.78 (d, J=8.9 Hz, 1H), 6.66 (s, 1H), 6.40 (s, 1H), 6.25 (s, 1H), 4.54 (dd, J=11.5, 1.5 Hz, 1H), 4.25 (d, J=11.5 Hz, 1H), 3.89 (t, J=9.8 Hz, 1H), 3.76 (s, 3H), 3.60 (d, J=11.6 Hz, 1H), 2.9 (t, J=9.9 Hz, 1H), 2.76 (d, J=11.9 Hz, 2H), 2.65-2.50 (m, 5H), 2.45 (s, 3H), 2.19 (s, 3H); ESI-MS m/z: 536.2 [M+H]$^+$.

Through different chiral raw materials or chiral separation methods, two optical isomers of compound 2 can be obtained, with structural formulas shown as follows:

Example 3: Compound 3

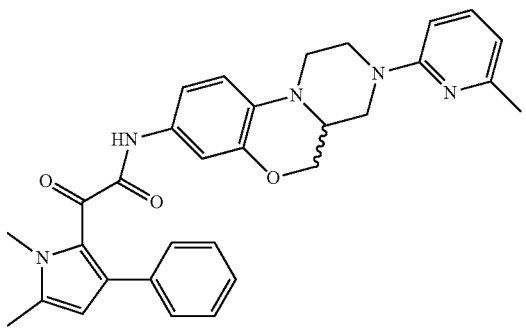

Compound 3 is obtained by a preparation method similar to that of Example 2 with raw material 2-bromo-4, 6-dimethylpyridine being replaced by 2-bromo-6-methylpyridine.

$^1$H NMR (400 MHz, DMSO-$d_6$) δ: 10.22 (s, 1H), 7.56-7.41 (m, 6H), 7.15 (s, 1H), 7.04 (d, J=8.9 Hz, 1H), 6.77 (d, J=8.9 Hz, 1H), 6.67 (d, J=8.9 Hz, 1H), 6.41 (d, J=8.9 Hz, 1H), 6.24 (s, 1H), 4.55 (dd, J=11.5, 1.5 Hz, 1H), 4.26 (d, J=11.5 Hz, 1H), 3.88 (t, J=9.8 Hz, 1H), 3.80 (s, 3H), 3.63 (d, J=11.6 Hz, 1H), 2.95 (t, J=9.9 Hz, 1H), 2.77 (d, J=11.7 Hz, 2H), 2.62-2.51 (m, 2H), 2.45 (s, 3H), 2.19 (s, 3H); ESI-MS m/z: 522.2 [M+H]$^+$.

Example 4: Compound 4

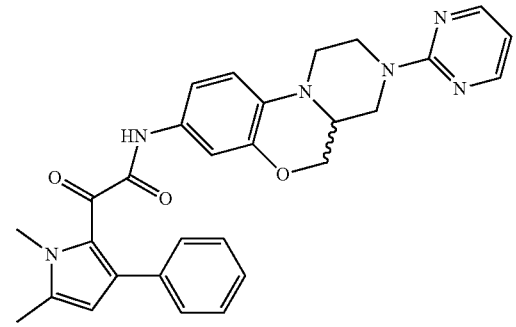

Compound 4 is obtained by a preparation method similar to that of Example 1 with raw material 2-chloro-5-fluoropyrimidine being replaced by 2-chloropyrimidine.

$^1$H NMR (400 MHz, DMSO-$d_6$) δ: 10.23 (s, 1H), 8.50 (d, J=9.3 Hz, 2H), 7.56-7.43 (m, 5H), 7.13 (s, 1H), 7.02 (d, J=8.8 Hz, 1H), 6.87-6.80 (m, 2H), 6.25 (s, 1H), 4.52 (dd, J=11.0, 1.5 Hz, 1H), 4.23 (d, J=11.2 Hz, 1H), 3.86 (t, J=9.8 Hz, 1H), 3.81 (s, 3H), 3.62 (d, J=11.5 Hz, 1H), 2.96 (t, J=9.9 Hz, 1H), 2.80 (d, J=11.7 Hz, 2H), 2.65-2.53 (m, 2H), 2.19 (s, 3H); ESI-MS m/z: 509.2 [M+H]$^+$.

Example 5: Compound 5

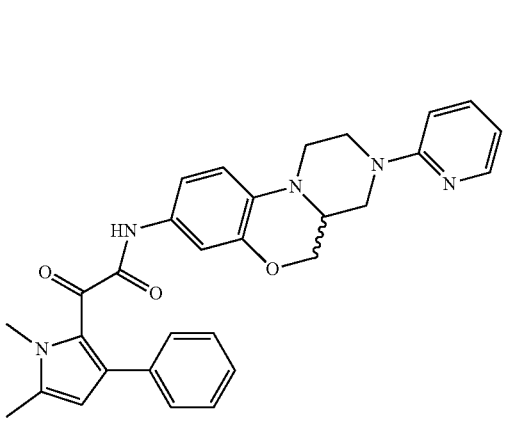

Compound 5 is obtained by a preparation method similar to that of Example 2 with raw material 2-bromo-4,6-dimethylpyridine being replaced by 2-bromopyridine.

$^1$H NMR (400 MHz, DMSO-d$_6$) δ: 10.22 (s, 1H), 8.12 (d, J=9.5 Hz, 1H), 7.56-7.41 (m, 6H), 7.15 (s, 1H), 7.04 (d, J=8.9 Hz, 1H), 6.83-6.73 (m, 2H), 6.63 (d, J=8.9 Hz, 1H), 6.24 (s, 1H), 4.53 (dd, J=11.2, 1.5 Hz, 1H), 4.25 (d, J=11.3 Hz, 1H), 3.87 (t, J=9.8 Hz, 1H), 3.79 (s, 3H), 3.62 (d, J=11.0 Hz, 1H), 2.96 (t, J=9.9 Hz, 1H), 2.78 (d, J=11.7 Hz, 2H), 2.62-2.53 (m, 2H), 2.18 (s, 3H); ESI-MS m/z: 508.2 [M+H]$^+$.

Example 6: Compound 6

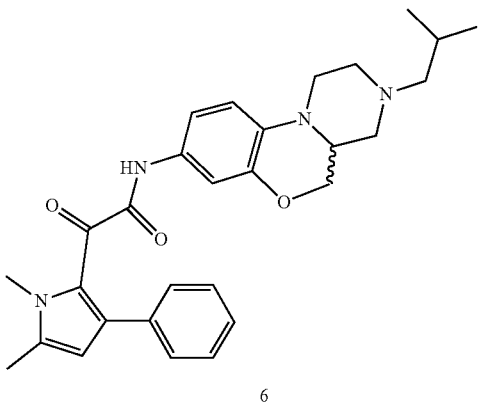

Preparation Route

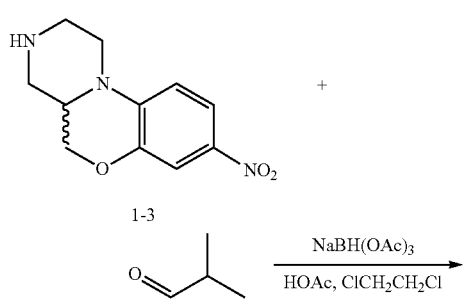

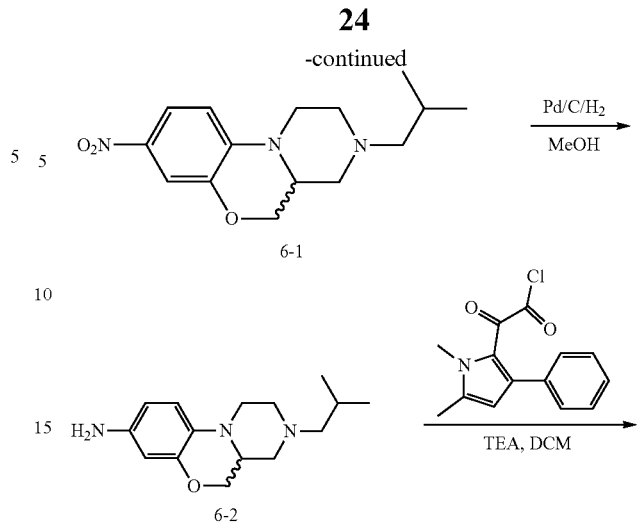

Step 1: Preparation of Compound 6-1

Compound 1-3 (705 mg, 3.0 mmol) and isobutyraldehyde (325 mg, 4.5 mmol) are dissolved into 1,2-dichloroethane (30 mL). The solution is added with HOAc, stirred at room temperature for 1 h and added with NaBH(OAc)$_3$ to carryout reaction at room temperature overnight; after the reaction is finished as monitored by LC-MS, the reaction solution is diluted with DCM, rinsed with saturated aq NaHCO$_3$ and separated, then the organic phase is concentrated and the residue is purified by column chromatography (DCM/MeOH=100/1 to 20/1), and the yellow solid (350 mg, yield 40%) is obtained, ESI-MS m/z: 292.1 [M+H]$^+$.

Step 2: Preparation of Compound 6-2

The crude product 6-1 (300 mg, 1.03 mmol) obtained in the previous step is dissolved into MeOH (20 mL). The solution is added with Pd/C (10%, 60 mg) and introduced with H$_2$ to react at room temperature overnight; after the reaction is finished as monitored by LC-MS, the reaction solution is filtered and the filtrate is concentrated, and the light yellow solid (200 mg, yield 74%) is obtained, ESI-MS m/z: 262.1 [M+H]$^+$.

Step 3: Preparation of Compound 6

The crude product 6-2 (200 mg, 0.76 mmol) obtained in the previous step is dissolved into DCM (20 mL). The solution is added with TEA (162 mg, 1.6 mmol) and cooled to 0° C. by ice salt bath under the protection of Ar, before DCM solution of 2-(1,5-dimethyl-3-phenyl-1H-pyrrol-2-yl)-2-oxoacetyl chloride (see WO2009130481 for how to synthesize it, 260 mg, 1 mmol) is dropped and reaction is carried out at room temperature for 30 min; after the reaction is finished as monitored by LC-MS, the reaction solution is added with ice water to quench reaction and separated, then the water phase is extracted with DCM (20 mL*2), while the organic phase is combined, dried by anhydrous Na$_2$SO$_4$ and filtered, then the filtrate is concentrated and the residue is purified by column chromatography (DCM/MeOH=100/1 to 20/1), and the light yellow solid (120 mg, yield 32%) is obtained.

$^1$H NMR (400 MHz, DMSO-d$_6$) δ: 10.25 (s, 1H), 7.54-7.42 (m, 5H), 7.11 (s, 1H), 7.03 (d, J=9.5 Hz, 1H), 6.78 (d, J=9.4 Hz, 1H), 6.25 (s, 1H), 4.54 (dd, J=11.5, 1.5 Hz, 1H), 4.25 (d, J=11.5 Hz, 1H), 3.89 (s, 3H), 3.21-3.15 (m, 1H), 2.96 (t, J=9.9 Hz, 1H), 2.76 (d, J=11.9 Hz, 2H), 2.61-2.50 (m, 2H), 2.19 (s, 3H), 2.09-2.00 (m, 2H), 1.65-1.55 (m, 2H), 0.91 (ss, 6H); ESI-MS m/z: 487.2 [M+H]$^+$.

Example 7: Compound 7

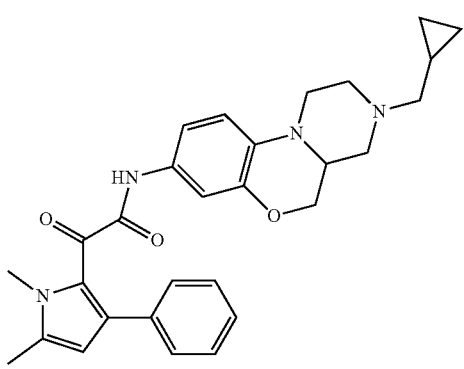

Compound 7 is obtained by a preparation method similar to that of Example 6 with raw material isobutyraldehyde being replaced by cyclopropyl formaldehyde.

$^1$H NMR (400 MHz, DMSO-d$_6$) δ: 10.23 (s, 1H), 7.55-7.43 (m, 5H), 7.12 (s, 1H), 7.02 (d, J=9.5 Hz, 1H), 6.79 (d, J=9.4 Hz, 1H), 6.24 (s, 1H), 4.53 (dd, J=11.5, 1.5 Hz, 1H), 4.23 (d, J=11.5 Hz, 1H), 3.87 (s, 3H), 3.21-3.13 (m, 1H), 2.95 (t, J=9.9 Hz, 1H), 2.74 (d, J=11.9 Hz, 2H), 2.61-2.52 (m, 2H), 2.18 (s, 3H), 2.09-2.01 (m, 2H), 1.63-1.53 (m, 1H), 1.15-1.23 (m, 1H), 0.55-0.45 (m, 2H), 0.32-0.23 (m, 2H); ESI-MS m/z: 485.2 [M+H]$^+$.

Example 8: Compound 8

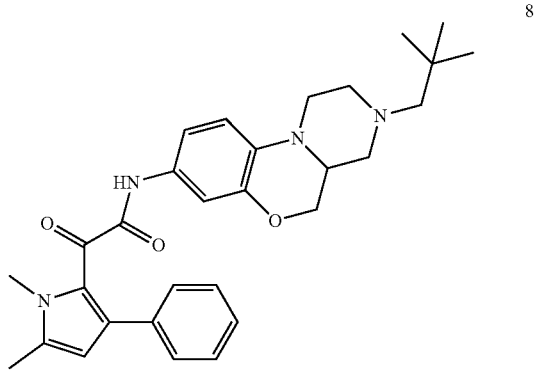 [SMILES: Cc1cc(-c2ccccc2)c(C(=O)C(=O)Nc2ccc3c(c2)OCC2CN(CC(C)(C)C)CCN32)n1C]

Compound 8 is obtained by a preparation method similar to that of Example 6 with raw material isobutyraldehyde being replaced by pivaldehyde.

$^1$H NMR (400 MHz, DMSO-d$_6$) δ: 10.24 (s, 1H), 7.54-7.43 (m, 5H), 7.10 (s, 1H), 7.01 (d, J=9.5 Hz, 1H), 6.77 (d, J=9.4 Hz, 1H), 6.25 (s, 1H), 4.52 (dd, J=11.5, 1.5 Hz, 1H), 4.24 (d, J=11.5 Hz, 1H), 3.86 (s, 3H), 3.20-3.12 (m, 1H), 2.92 (t, J=9.9 Hz, 1H), 2.72 (d, J=11.9 Hz, 2H), 2.60-2.49 (m, 2H), 2.17 (s, 3H), 2.10-2.01 (m, 2H), 1.65-1.52 (m, 1H), 1.15-1.02 (m, 9H); ESI-MS m/z: 501.2 [M+H]$^+$.

Example 9: Compound 9

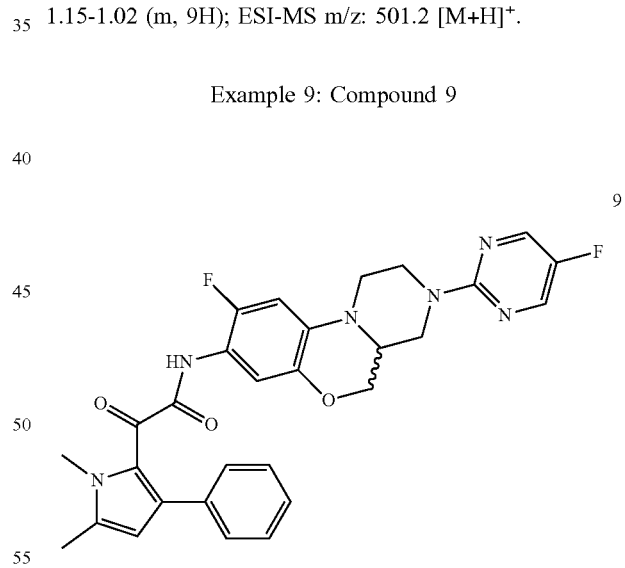

Compound 9 is obtained by a preparation method similar to that of Example 1 with raw material 3,4-difluoronitrobenzene being replaced by 2,4,5-trifluoronitrobenzene.

$^1$H NMR (400 MHz, DMSO-d$_6$) δ: 10.28 (s, 1H), 8.78 (s, 2H), 7.53-7.42 (m, 5H), 7.06 (s, 1H), 6.93 (d, J=10.2 Hz, 1H), 6.30 (s, 1H), 4.57 (dd, J=11.1, 1.5 Hz, 1H), 4.21 (d, J=11.5 Hz, 1H), 3.86 (t, J=9.7 Hz, 1H), 3.79 (s, 3H), 3.65 (d, J=11.6 Hz, 1H), 2.95 (t, J=9.9 Hz, 1H), 2.78 (d, J=12.1 Hz, 2H), 2.61-2.52 (m, 2H), 2.19 (s, 3H); ESI-MS m/z: 545.2 [M+H]$^+$.

Example 10: Compound 10

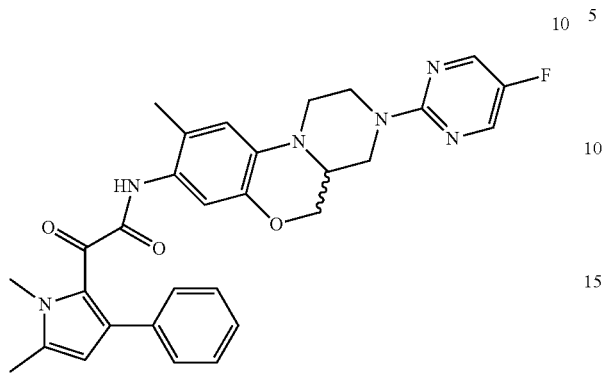

Compound 10 is obtained by a preparation method similar to that of Example 1 with raw material 3,4-difluoronitrobenzene being replaced by 2-nitro-4,5-difluorotoluene.

$^1$H NMR (400 MHz, DMSO-d$_6$) δ: 10.26 (s, 1H), 8.78 (s, 2H), 7.53-7.43 (m, 5H), 7.03 (s, 1H), 6.87 (s, 1H), 6.26 (s, 1H), 4.57 (dd, J=11.1, 1.5 Hz, 1H), 4.21 (d, J=11.5 Hz, 1H), 3.86 (t, J=9.7 Hz, 1H), 3.79 (s, 3H), 3.65 (d, J=11.6 Hz, 1H), 2.95 (t, J=9.9 Hz, 1H), 2.78 (d, J=12.1, 2H), 2.61-2.50 (m, 2H), 2.19 (s, 3H), 2.11 (s, 3H); ESI-MS m/z: 541.2 [M+H]$^+$.

Example 11: Compound 11

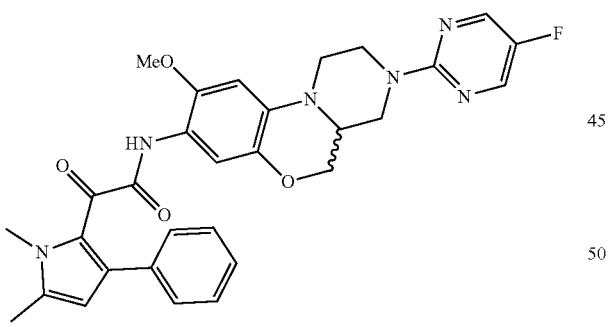

Compound 11 is obtained by a preparation method similar to that of Example 1 with raw material 3,4-difluoronitrobenzene being replaced by 2-nitro-4,5-difluoroanisole.

$^1$H NMR (400 MHz, DMSO-d$_6$) δ: 10.25 (s, 1H), 8.77 (s, 2H), 7.53-7.42 (m, 5H), 7.09 (s, 1H), 6.55 (s, 1H), 6.26 (s, 1H), 4.58 (dd, J=11.2, 1.5 Hz, 1H), 4.22 (d, J=11.5 Hz, 1H), 3.87-3.82 (m, 4H), 3.79 (s, 3H), 3.65 (d, J=11.5 Hz, 1H), 2.95 (t, J=9.5 Hz, 1H), 2.78 (d, J=11.6 Hz, 2H), 2.62-2.50 (m, 2H), 2.17 (s, 3H); ESI-MS m/z: 557.2 [M+H]$^+$.

Example 12: Compound 12

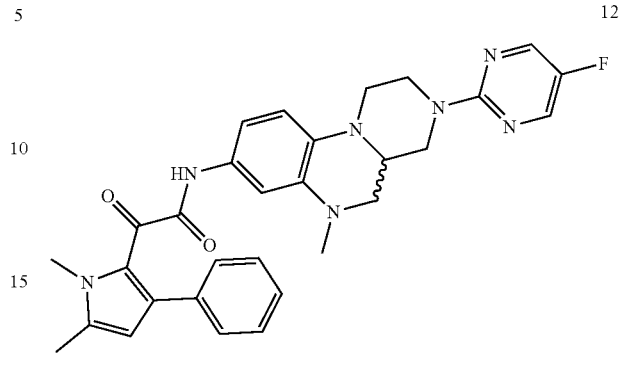

Preparation Route

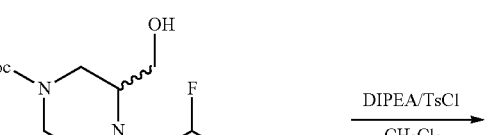

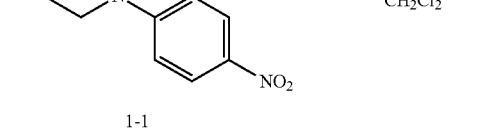

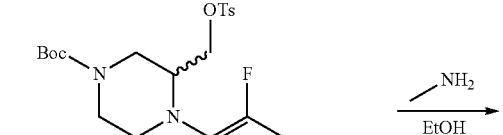

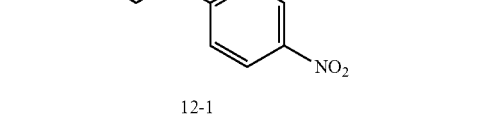

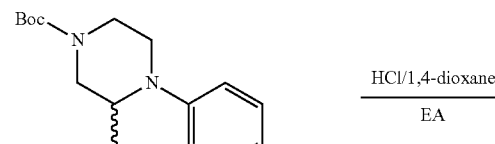

-continued

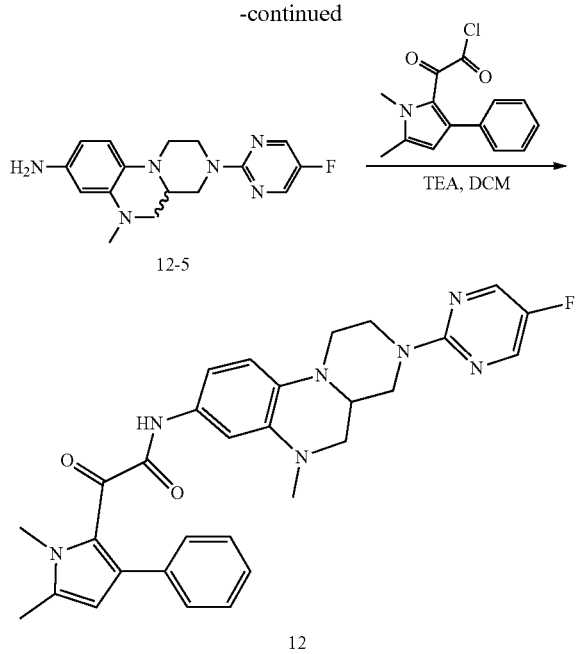

12-5

12

Step 1: Preparation of Compound 12-1

Tert-butyl 4-(2-fluoro-4-nitrophenyl)-3-(hydroxymethyl) piperazine-1-formate (3.55 g, 10 mmol) is dissolved into DCM (50 mL). The solution is successively added with DIPEA (2.6 g, 20 mmol) and TsCl (2.3 g, 12 mmol), and stirred at room temperature to react overnight; after the reaction is finished as monitored by LC-MS, the reaction solution is added into water (50 mL) and separated; then the water layer is extracted with DCM (30 mL), while the organic phase is combined, rinsed successively with water (50 mL) and saturated salt water (50 mL), dried by $Na_2SO_4$ and filtered, then the filtrate is concentrated and the residue is processed by column chromatography (PE/EA=20/1 to 5/1), and the light yellow jelly (4.0 g, yield 78%) is obtained, ESI-MS m/z: 510.1 $[M+H]^+$.

Step 2: Preparation of Compound 12-2

Compound 12-1 (1.4 g, 2.75 mmol) is dissolved into EtOH (20 mL), then the solution is added with methylamine alcohol solution (25%-30%, 1.8 g, ca. 55 mmol), and reaction is carried out at 80° C. overnight in sealed tube; after the reaction is finished as monitored by LC-MS, the reaction solution is concentrated and the residue is purified by column chromatography (PE/EA=5/1 to 1/1), and the yellow jelly (480 mg, yield 50%) is obtained, ESI-MS m/z: 349.1 $[M+H]^+$.

Step 3: Preparation of Compound 12-3

Compound 12-2 (3.48 g, 10.0 mmol) is dissolved into EA (50 mL), then the solution is added with HCl/dioxane (4.0 M, 15 mL) and stirred at room temperature for 3 h; after the reaction is finished as monitored by LC-MS, the reaction solution is directly concentrated, and the yellow solid crude product (3.5 g, yield 100%) is obtained and directly used in the next reaction without purification, ESI-MS m/z: 249.1 $[M+H]^+$.

Step 4: Preparation of Compound 12-4

The crude product 12-3 (2.1 g, 6.0 mmol) obtained in the previous step is suspended in diethylene glycol dimethyl ether (20 mL). The suspension is added with 2-chloro-5-fluoropyrimidine (875 mg, 6.6 mmol) and anhydrous $K_2CO_3$ (4.15 g, 30 mmol), and heated to 100° C. to react for 6 h; after the reaction is finished as monitored by LC-MS, the reaction solution is cooled and filtered; then the obtained filter cake is pulped with cold water (10 mL) and the solution is filtered, then the obtained filter cake is rinsed successively with water and PE and dried, and the yellow solid is obtained (1.5 g, yield 72%), ESI-MS m/z: 345.1 $[M+H]^+$.

Step 5: Preparation of Compound 12-5

The crude product 12-4 (1.5 g, 4.36 mmol) obtained in the previous step is dissolved into methanol (20 mL). The solution is added with Pd/C (10%, 200 mg) and introduced with $H_2$ to react at room temperature overnight; after the reaction is finished as monitored by LC-MS, the reaction solution is filtered and the filtrate is concentrated, and the light yellow solid (1.0 g, yield 73%) is obtained, ESI-MS m/z: 315.1 $[M+H]^+$.

Step 6: Preparation of Compound 12

The crude product 12-5 (167 mg, 0.5 mmol) obtained in the previous step is dissolved into DCM (15 mL). The solution is added with TEA (101 mg, 1.0 mmol) and cooled to 0° C. by ice salt bath under the protection of Ar, before DCM solution of 2-(1,5-dimethyl-3-phenyl-1H-pyrrol-2-yl)-2-oxoacetyl chloride (see WO2009130481 for how to synthesize it, 167 mg, 0.6 mmol) is dropped and reaction is carried out at room temperature for 30 min; after the reaction is finished as monitored by LC-MS, the reaction solution is added with ice water to quench reaction and separated; then water phase is extracted with DCM (20 mL*2), while the organic phase is combined, dried by anhydrous $Na_2SO_4$ and filtered, before the filtrate is concentrated and the residue is purified by column chromatography (DCM/MeOH=100/1 to 20/1), and the light yellow solid (100 mg, yield 37%) is obtained.

$^1$H NMR (400 MHz, DMSO-$d_6$) δ: 10.25 (s, 1H), 8.76 (s, 2H), 7.55-7.43 (m, 5H), 6.71-6.65 (m, 3H), 6.25 (s, 1H), 3.86 (s, 3H), 3.64 (d, J=12.3 Hz, 1H), 3.22-3.11 (m, 2H), 3.02 (d, J=10.1 Hz, 2H), 2.97-2.81 (m, 3H), 2.75-2.65 (m, 4H), 2.19 (s, 3H); ESI-MS m/z: 540.2 $[M+H]^+$.

Through different chiral raw materials or chiral separation methods, two optical isomers of compound 12 can be obtained with structural formulas shown as follows:

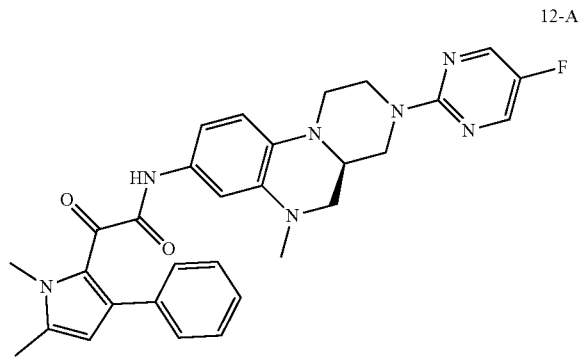 [SMILES: Cc1cc(-c2ccccc2)c(C(=O)C(=O)Nc2ccc3c(c2)N(C)CC2CN(c4ncc(F)cn4)CCN32)n1C]

12-A

12-B

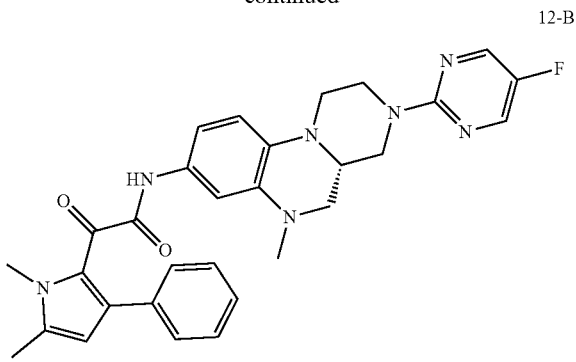

Example 13: Compound 13

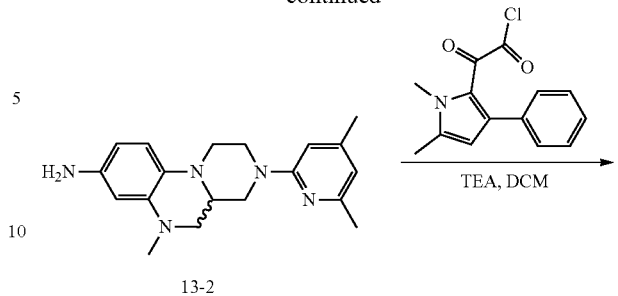

13-2

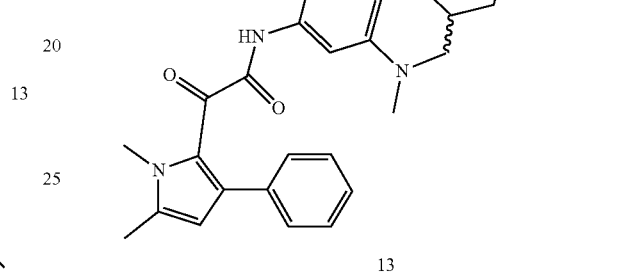

13

Step 1: Preparation of Compound 13-1

Compound 12-3 (745 mg, 3.0 mmol), 2-bromo-4,6-dimethylpyridine (670 mg, 3.6 mmol), sodium tert-butoxide (721 mg, 7.5 mmol), BINAP (187 mg, 0.3 mmol) are dissolved into Toluene (50 mL). The solution is heated to 100° C. under the protection of Ar to react overnight; after the reaction is finished as monitored by LC-MS, the reaction solution is filtered, and the filtrate is concentrated and purified by column chromatography (PE/EA=10/1 to 3/1), and the yellow solid (300 mg, yield 28%) is obtained, ESI-MS m/z: 354.1 [M+H]+.

Step 2: Preparation of Compound 13-2

Compound 13-1 (300 mg, 0.85 mmol) obtained in the previous step is dissolved into MeOH (20 mL). The solution is added with Pd/C (10%, 60 mg) and introduced with $H_2$ to react at room temperature overnight; after the reaction is finished as monitored by LC-MS, the reaction solution is filtered, and the filtrate is concentrated, and the light yellow solid crude product (200 mg, yield 72%) is obtained, ESI-MS m/z: 324.1 [M+H]+.

Step 3: Preparation of Compound 13

The crude product 13-2 (200 mg, 0.62 mmol) obtained in the previous step is dissolved into DCM (20 mL). The solution is added with TEA (132 mg, 1.3 mmol) and cooled to 0° C. by ice salt bath under the protection of Ar, before the DCM solution of 2-(1,5-dimethyl-3-phenyl-1H-pyrrol-2-yl)-2-oxoacetyl chloride (see WO2009130481 for how to synthesize it, 261 mg, 1 mmol) is dropped and the reaction is carried out at room temperature for 30 min; after the reaction is finished as monitored by LC-MS, the reaction solution is added with ice water to quench reaction and Preparation Route

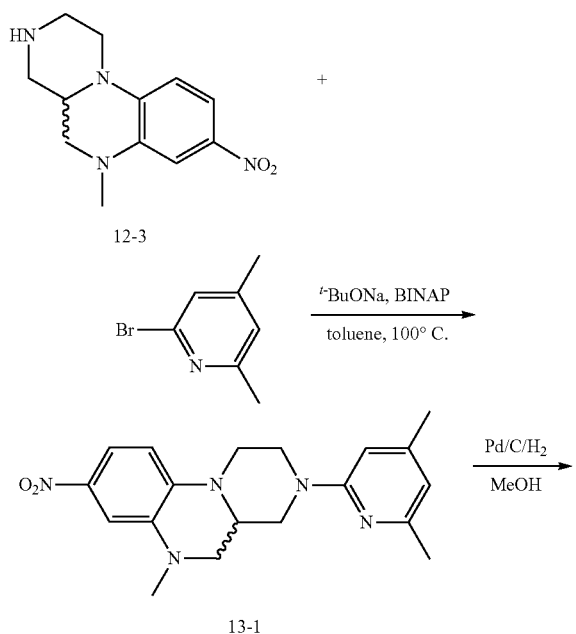

separated; then the water phase is extracted with DCM (20 mL*2), while the organic phase is combined, dried by anhydrous Na₂SO₄ and filtered, the filtrate is concentrated and the residue is purified by column chromatography (DCM/MeOH=100/1 to 20/1), and the light yellow solid (100 mg, yield 29%) is obtained.

¹H NMR (400 MHz, DMSO-d₆) δ: 10.22 (s, 1H), 7.54-7.42 (m, 5H), 6.75-7.68 (m, 4H), 6.43 (s, 1H), 6.25 (s, 1H), 3.85 (s, 3H), 3.65 (d, J=11.8 Hz, 1H), 3.20-3.10 (m, 2H), 3.01 (d, J=9.8 Hz, 2H), 2.97-2.81 (m, 3H), 2.75-2.65 (m, 4H), 2.50 (s, 3H), 2.46 (s, 3H), 2.19 (s, 3H); ESI-MS m/z: 549.2 [M+H]⁺.

Through different chiral raw materials or chiral separation methods, two optical isomers of compound 13 can be obtained with structural formulas shown as follows:

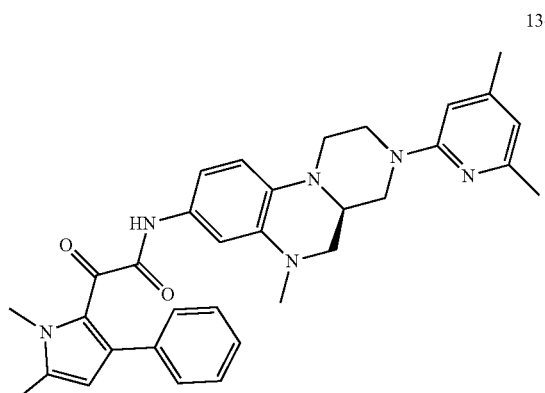

Example 14: Compound 14

Preparation Route

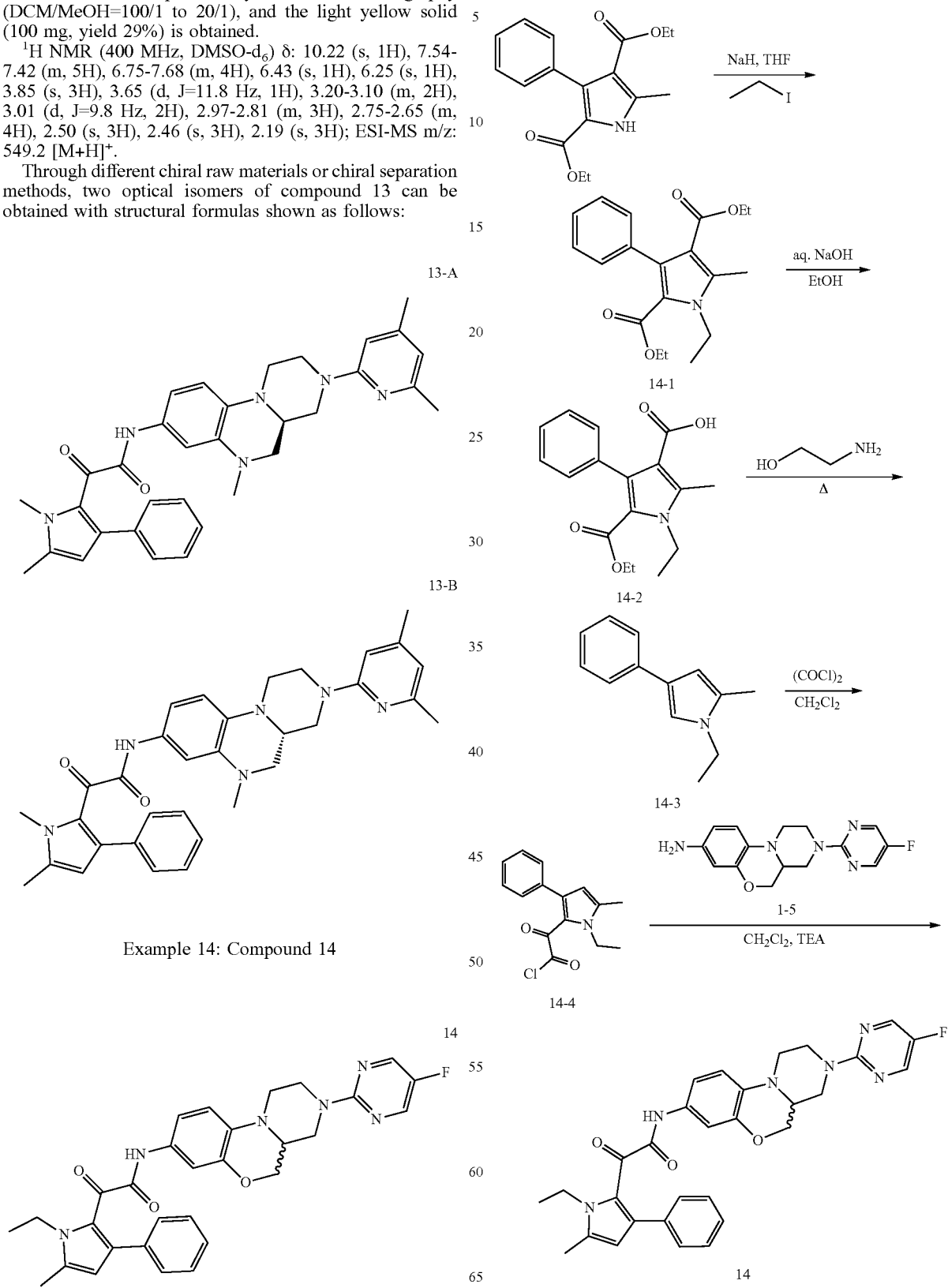

Step 1: Preparation of Compound 14-1

Diethyl 5-methyl-3-phenyl-1H-pyrrole-2,4-dicarboxylate (6 g, 20 mmol) is dissolved into THF (50 mL). The solution is cooled to 0° C. by ice salt bath, added with NaH (1.2 g, 30 mmol, 60%) in batches, heated to room temperature and stirred for 1 h, before the solution is cooled to 0° C. again and added with MeI (8.5 g, 60 mmol) to react at room temperature overnight; after the reaction is finished as monitored by LC-MS, the reaction solution is added with cold diluted hydrochloric acid to quench reaction (pH about 7-8) and concentrated; then the residue is added into DCM (80 mL) and the solution is separated, before the water phase is extracted with DCM (50 mL*2), while the organic phase is combined, rinsed successively with water (100 mL) and saturated salt water (100 mL), dried by $Na_2SO_4$ and filtered, and the filtrate is concentrated and light yellow solid (5.9 g, yield 90%) is obtained and directly used in the next reaction, ESI-MS m/z: 330.1 $[M+H]^+$.

Step 2: Preparation of Compound 14-2

Compound 14-1 (5.9 g, 18 mmol) is dissolved into EtOH (100 mL). The solution is added with aqueous solution (100 mL) of NaOH (4.32 g, 108 mmol) and heated until reflux to react overnight; after the reaction is finished as monitored by LC-MS, EtOH is removed by rotary evaporation, and the solution is adjusted to pH=2 with concentrated hydrochloric acid in ice salt bath to make solid precipitate, stirred for 1 h and filtered; then the filter cake is successively rinsed with water and PE and dried, and the light yellow solid (3.4 g, yield 70%) is obtained. The crude product is directly used in the next reaction, ESI-MS m/z: 274.1 $[M+H]^+$.

Step 3: Preparation of Compound 14-3

Compound 14-2 (5.8 g, 21.2 mmol) is suspended in ethanolamine (15 mL). The solution is heated to 175° C. under the protection of Ar to react for 1 h; after the reaction is finished as monitored by LC-MS, the reaction solution is cooled, diluted with water (30 mL) and extracted with EA (20 mL*2); then the organic phase is combined, successively rinsed with water (20 mL) and saturated salt water (20 mL), dried and concentrated, then the residue is processed by neutral alumina column chromatography, and the off-white solid (2.8 g, yield 71%) is obtained, ESI-MS m/z: 186.1 $[M+H]^+$.

Step 4: Preparation of Compound 14-4

Compound 14-3 (556 mg, 3 mmol) is dissolved into DCM (10 mL). The solution is cooled to 0° C. by ice salt bath under the protection of Ar, then $(COCl)_2$ (419 mg, 3.3 mmol) is dropped to react at room temperature for 1 h; after the reaction is finished as monitored by LC-MS, the reaction solution is concentrated, and the brownish yellow oil (248 mg, yield 90%) is obtained and directly used in the next reaction.

Step 5: Preparation of Compound 14

Compound 1-5 (300 mg, 1 mmol) is dissolved into DCM (20 mL). The solution is added with TEA (202 mg, 2.0 mmol) and cooled to 0° C. by ice salt bath under the protection of Ar, before compound 14-4 (331 mg, 1.2 mmol) is dropped to react at room temperature for 30 min; after the reaction is finished as monitored by LC-MS, reaction solution is added with ice water to quench reaction and separated; then the water phase is extracted with DCM (20 mL*2), while the organic phase is combined, dried by anhydrous $Na_2SO_4$ and filtered, before the filtrate is concentrated and the residue is purified by column chromatography (DCM/MeOH=100/1 to 20/1), and the light yellow solid (270 mg, yield 50%) is obtained.

$^1$H NMR (400 MHz, DMSO-$d_6$) δ: 10.26 (s, 1H), 8.79 (s, 2H), 7.55-7.43 (m, 5H), 7.17-7.08 (m, 2H), 6.79 (d, J=9.2 Hz, 1H), 6.32 (s, 1H), 4.57 (dd, J=12.1, 1.5 Hz, 1H), 4.25-4.15 (m, 3H), 3.87 (t, J=9.8 Hz, 1H), 3.64 (d, J=11.6 Hz, 1H), 2.96 (t, J=9.9 Hz, 1H), 2.76 (d, J=12.1, 2H), 2.62-2.52 (m, 2H), 2.18 (s, 3H), 1.22 (t, 3H); ESI-MS m/z: 541.2 $[M+H]^+$.

Example 15: Compound 15

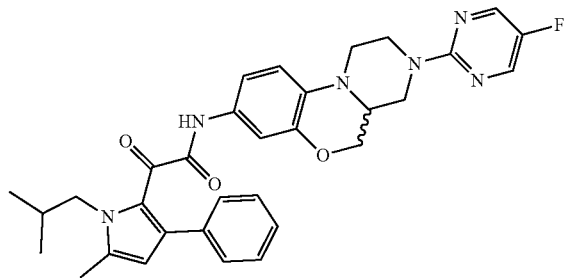

Compound 15 is obtained by a preparation method similar to that of Example 14 with raw material iodoethane being replaced by isobutyl bromide.

$^1$H NMR (400 MHz, DMSO-$d_6$) δ: 10.25 (s, 1H), 8.78 (s, 2H), 7.55-7.43 (m, 5H), 7.15-7.06 (m, 2H), 6.78 (d, J=9.2 Hz, 1H), 6.28 (s, 1H), 4.57 (dd, J=12.1, 1.5 Hz, 1H), 4.25-4.15 (m, 3H), 3.86 (t, J=9.8 Hz, 1H), 3.64 (d, J=11.6 Hz, 1H), 2.96 (t, J=9.9 Hz, 1H), 2.76 (d, J=12.1, 2H), 2.57-2.48 (m, 2H), 2.18 (s, 3H), 2.02-1.98 (m, 1H), 1.12 (ss, 6H); ESI-MS m/z: 569.2 $[M+H]^+$.

Example 16: Compound 16

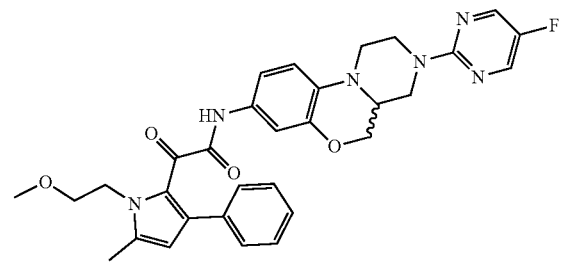

Compound 16 is obtained by a preparation method similar to that of Example 14, wherein the raw material iodoethane is replaced by 2-bromoethyl methyl ether.

$^1$H NMR (400 MHz, DMSO-$d_6$) δ: 10.27 (s, 1H), 8.78 (s, 2H), 7.55-7.43 (m, 5H), 7.17-7.05 (m, 2H), 6.78 (d, J=9.8 Hz, 1H), 6.32 (s, 1H), 4.56-4.45 (m, 2H), 4.25-4.15 (m, 2H), 3.87 (t, J=9.8 Hz, 1H), 3.65-3.54 (m, 3H), 3.32 (s, 3H), 2.96

(t, J=9.9 Hz, 1H), 2.75 (d, J=11.8, 2H), 2.61-2.51 (m, 2H), 2.18 (s, 3H); ESI-MS m/z: 571.2 [M+H]⁺.

Example 17: Compound 17

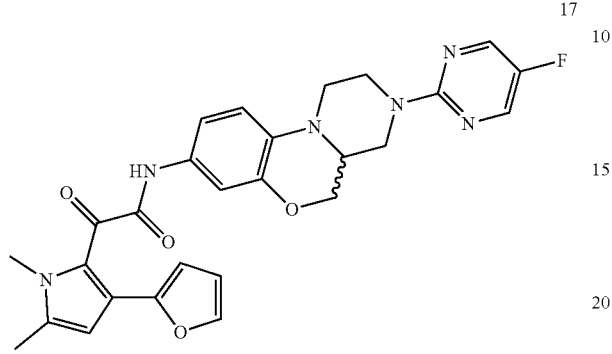

Preparation Route

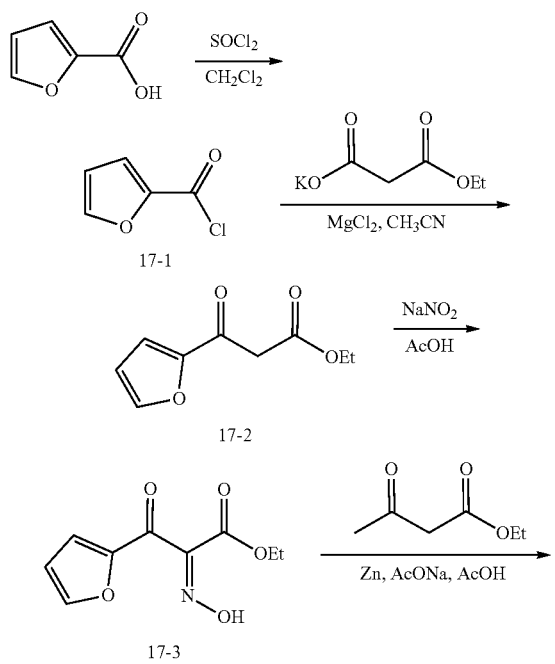

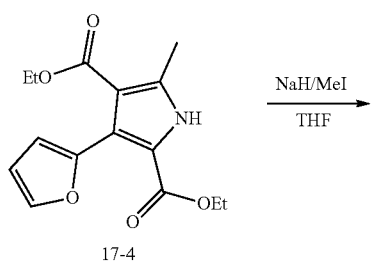

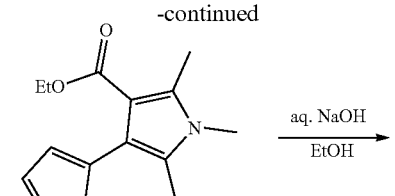

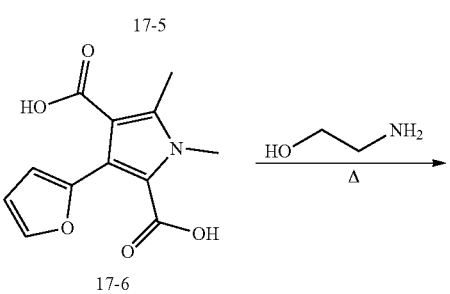

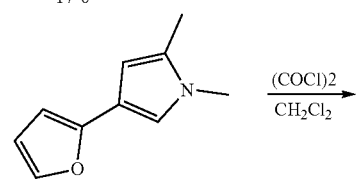

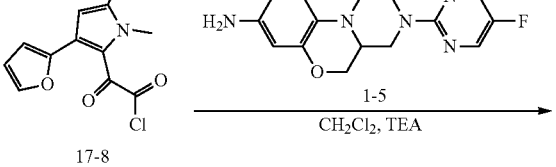

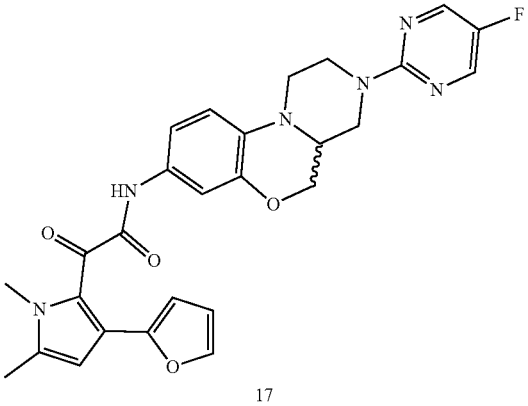

Step 1: Preparation of Compound 17-1

2-furoic acid (11.2 g, 0.1 mol) is dissolved into DCM (150 mL). The solution is added with SOCl2 (36 mL, 0.5 mol) and the reaction is carried out at room temperature overnight; after reaction is finished as monitored by LC-MS, reaction solution is concentrated, and light brown jelly (13 g, yield 100%) is obtained and directly used in the next reaction.

Step 2: Preparation of Compound 17-2

Potassium salt of monoethyl malonate (13.4 g, 78.5 mmol) is dissolved into ACN (80 mL). The solution is successively added with TEA (11.7 mL, 84.3 mmol) and anhydrous $MgCl_2$ (9.12 g, 95.8 mmol) at 10° C. to react at room temperature for 2.5 h, before the reaction solution is cooled to 0° C. and ACN solution (30 mL) of compound 17-1 (5 g, 38.3 mmol) is dropped to react at room temperature overnight; after the reaction is finished as monitored by LC-MS, the reaction solution is concentrated, and the residue Toluene is heated to reflux for dissolution, cooled, acidified with 13% diluted hydrochloric acid (50 mL) at 0-5° C., stirred for about 15 min and separated; then the organic phase is successively rinsed with diluted hydrochloric acid (50 mL*2) and water (25 mL*2) and concentrated, then the residue is processed by column chromatography (PE/EA=10/1 to 4/1), and the grayish yellow solid (5 g, yield 72%) is obtained, ESI-MS m/z: 183.1 $[M+H]^+$.

Step 3: Preparation of Compound 17-3

Compound 17-2 (9.1 g, 50 mmol) is dissolved into HOAc (25 mL). Aqueous solution (30 mL) of $NaNO_2$ (4.5 g, 65 mmol) is slowly dropped for 1 h with temperature maintained at 0-5° C., and solid precipitates out during the dropping process, before the solution is heated to room temperature and stirred react for about 30 min, added with water (200 mL) and further stirred for about 30 min; after the reaction is finished as monitored by LC-MS, reaction solution is filtered, and the filtrate is extracted with DCM (50 mL*2); then organic phase is combined, successively rinsed with water (50 mL*2) and saturated salt water (50 mL*2), dried by $Na_2SO_4$ and filtered, then the filtrate is concentrated, and the light yellow solid (7 g, yield 66%) is obtained, ESI-MS m/z: 212.1 $[M+H]^+$.

Step 4: Preparation of Compound 17-4

Acetyl EA (7.25 g, 56 mmol), zinc powder (9.8 g 151 mmol) and NaOAc (10.2 g, 121 mmol) are dissolved into HOAc. The solution is heated to 60° C. and added with HOAc solution of compound 7-3 (10.6 g, 50 mmol) in three batches under vigorous stirring with temperature quickly rising to 90° C. or so, before the reaction is carried out for 3 h with temperature maintained within 60-75° C., and zinc powder (4.9 g, 75 mmol) is supplemented to make reaction continue to work for about 1 h; after the reaction is finished as monitored by LC-MS, the reaction liquid is cooled and filtered, and filtrate is concentrated by azeotropy with Toluene to remove residual HOAc, added with water (200 mL) and EA (50 mL), stirred and separated; then water phase is extracted with EA (30 mL*2), while organic phase is combined, successively rinsed with sodium bicarbonate aqueous solution (100 mL*2), water (100 mL*2) and saturated salt water (100 mL*2), dried by anhydrous $Na_2SO_4$ and filtered, then the filtrate is concentrated, while the residue is pulped with DCM/PE (1/6, 15 mL) and filtered, and the light yellow solid (5.8 g, yield 40%) is obtained, ESI-MS m/z: 292.1 $[M+H]^+$.

Step 5: Preparation of Compound 17-5

Compound 17-4 (5.8 g, 20 mmol) is dissolved into THF (50 mL). The solution is cooled to 0° C. by ice salt bath, added with NaH (1.2 g, 30 mmol, 60%) in batches, heated to room temperature and stirred for 1 h, before the solution is cooled to 0° C. again and added with MeI (8.5 g, 60 mmol) to react at room temperature overnight; after the reaction is finished as monitored by LC-MS, the reaction solution is added with cold diluted hydrochloric acid to quench reaction (pH about 7-8) and concentrated; then the residue is added into DCM (80 mL) and the solution is separated, before the water phase is extracted with DCM (50 mL*2), while the organic phase is combined, rinsed successively with water (100 mL) and saturated salt water (100 mL), dried by $Na_2SO_4$ and filtered, and the filtrate is concentrated and light yellow solid (5.5 g, yield 90%) is obtained, and directly used in the next reaction, ESI-MS m/z: 306.1 $[M+H]^+$.

Step 6: Preparation of Compound 17-6

Compound 17-5 (5.5 g, 18 mmol) is dissolved into EtOH (100 mL). The solution is added with aqueous solution (100 mL) of NaOH (4.32 g, 108 mmol) and heated until reflux to react overnight; after the reaction is finished as monitored by LC-MS, EtOH is removed by rotary evaporation, and the solution is adjusted to pH=2 with concentrated hydrochloric acid in ice salt bath to make solid precipitate, stirred for 1 h and filtered; then the filter cake is successively rinsed with water and PE and dried, and the light yellow solid (2.5 g, yield 55%) is obtained. The crude product is directly used in the next reaction, ESI-MS m/z: 250.1 $[M+H]^+$.

Step 7: Preparation of Compound 17-7

Compound 17-6 (2.5 g, 10 mmol) is suspended in ethanolamine (10 mL). The solution is heated to 175° C. under the protection of Ar to react for 1 h; after the reaction is finished as monitored by LC-MS, the reaction solution is cooled, diluted with water (30 mL) and extracted with EA (20 mL*2); then the organic phase is combined, successively rinsed with water (20 mL) and saturated salt water (20 mL), dried and concentrated, then the residue is processed by neutral alumina column chromatography (PE/EA=10/1 to 4/1), and the offwhite solid (805 mg, yield 50%) is obtained, ESI-MS m/z: 162.1 $[M+H]^+$.

Step 8: Preparation of Compound 17-8

Compound 17-7 (805 mg, 5 mmol) is dissolved into DCM (10 mL). The solution is cooled to 0° C. by ice salt bath under the protection of Ar; then oxalyl chloride (700 mg, 5.5 mmol) is dropped to react at room temperature for 1 h; after the reaction is finished as monitored by LC-MS, the reaction solution is concentrated, and brownish yellow oil (1.13 g, yield 90%) is obtained and directly used in the next reaction.

Step 9: Preparation of Compound 17

Compound 1-5 (300 mg, 1 mmol) is dissolved into DCM (20 mL). The solution is added with TEA (202 mg, 2.0 mmol) and cooled to 0° C. by ice salt bath under the protection of Ar, before DCM solution of 2-(3-(furan-2-yl)-1,5-dimethyl-1H-pyrrolin-2-yl)-2-oxoacetyl chloride (compound 17-8, 300 mg, 1.2 mmol) to react at room temperature for 30 min; after the reaction is finished as monitored by LC-MS, reaction solution is added with ice water to quench reaction and separated; then the oil phase is extracted with DCM (20 mL*2), while the organic phase is combined, dried by $Na_2SO_4$ and filtered, then the filtrate is concentrated and purified by column chromatography (DCM/MeOH=100/1 to 20/1), and the light yellow solid (200 mg, yield 39%) is obtained.

$^1$H NMR (400 MHz, DMSO-$d_6$) δ: 10.25 (s, 1H), 8.79 (s, 2H), 7.72 (s, 1H), 7.17-7.08 (m, 3H), 6.76-6.68 (m, 2H), 6.18 (s, 1H), 4.56 (dd, J=11.3, 1.5 Hz, 1H), 4.20 (d, J=11.5 Hz, 1H), 3.87 (t, J=9.8 Hz, 1H), 3.78 (s, 3H), 3.64 (d, J=11.6

Hz, 1H), 2.96 (t, J=9.9 Hz, 1H), 2.78 (d, J=12.1, 2H), 2.61-2.53 (m, 2H), 2.16 (s, 3H); ESI-MS m/z: 517.2 [M+H]$^+$.

Example 18: Compound 18

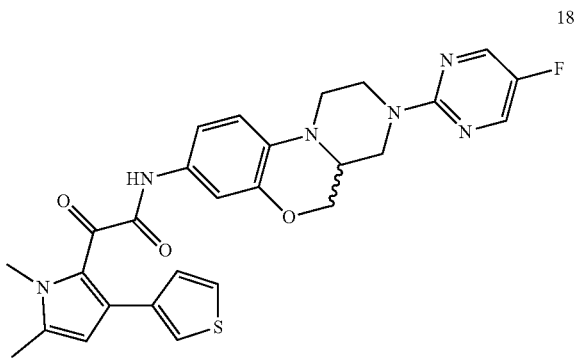 [SMILES: Cc1cc(-c2ccsc2)c(C(=O)C(=O)Nc2ccc3c(c2)OCC2CN(c4ncc(F)cn4)CCN32)n1C]

Compound 18 is obtained by a preparation method similar to that of Example 17 with raw material 2-furoic being replaced by 3-thiophenemalonic acid.

$^1$H NMR (400 MHz, DMSO-d$_6$) δ: 10.27 (s, 1H), 8.79 (s, 2H), 7.95 (d, J=2.3 Hz, 1H), 7.85 (dd, J=11.5, 2.3 Hz, 1H), 7.38 (dd, J=11.3, 2.4 Hz, 1H), 7.17-7.08 (m, 2H), 6.76 (d, J=11.2 Hz, 1H), 6.22 (s, 1H), 4.56 (dd, J=11.3, 1.5 Hz, 1H), 4.20 (d, J=11.5 Hz, 1H), 3.87 (t, J=9.8 Hz, 1H), 3.78 (s, 3H), 3.66 (d, J=11.6 Hz, 1H), 2.95 (t, J=9.9 Hz, 1H), 2.77 (d, J=12.1, 2H), 2.61-2.52 (m, 2H), 2.17 (s, 3H); ESI-MS m/z: 533.2 [M+H]$^+$.

Example 19: Compound 19

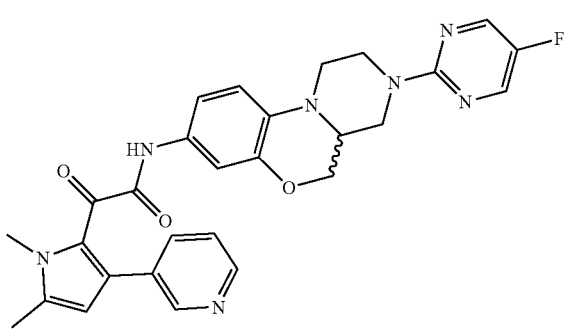

Compound 19 is obtained by a preparation method similar to that of Example 17 with raw material 2-furoic being replaced by nicotinic acid.

$^1$H NMR (400 MHz, DMSO-d$_6$) δ: 10.28 (s, 1H), 9.13 (s, 1H), 8.79 (s, 2H), 8.73 (d, J=11.5 Hz, 1H), 8.42 (d, J=10.8 Hz, 1H), 7.55-7.52 (m, 1H), 7.18-7.07 (m, 2H), 6.79 (d, J=11.2 Hz, 1H), 6.21 (s, 1H), 4.55 (dd, J=11.3, 1.5 Hz, 1H), 4.21 (d, J=11.5 Hz, 1H), 3.86 (t, J=9.8 Hz, 1H), 3.79 (s, 3H), 3.67 (d, J=11.6 Hz, 1H), 2.96 (t, J=8.9 Hz, 1H), 2.76 (d, J=11.5, 2H), 2.60-2.50 (m, 2H), 2.18 (s, 3H); ESI-MS m/z: 528.2 [M+H]$^+$.

Example 20: In Vtro Minimum Inhibitory Concentration (MIC) Test

Strains used in the experiment are inoculated on Sabouraud glucose agar culture medium and cultured at 35° C. for 5 d; then 1 mL of 0.2% Tween diluted with 0.85% sterile normal saline is added into Sabouraud dextrose agar culture medium, and plate is shaken, before solution collected from plate surface is transferred into sterile tube, and fungus containing supernatant is transferred into sterile tube in full suspension so as to prepare strain diluent with concentration from 0.4*10$^6$ to 5*10$^6$ CFU/mL. Strain diluent prepared herein is diluted into RPMI 1640 culture medium in a ratio of 1:100. Such biological suspension is added into hole on the plate which contains drug diluent; all plates are incubated at 35° C. for 24-48 h, and light in wavelength of 485 nm is monitored for each hole to evaluate strain growth. MIC of compound is defined as follows: Compared with negative control free of drug, the lowest drug concentration able to inhibit growth for more than 80% of strains. A indicates MIC value>0.1 μg/mL, B indicates 0.1 μg/mL≥MIC value>0.01 μg/mL, and C indicates MIC value<0.01 μg/mL.

TABLE 1

Minimum Inhibitory Concentration of Compounds, MIC value (μg/mL)

| Examples | Aspergillus niger | Aspergillus fumigatus | Aspergillus terreus | Aspergillus flavus |
| --- | --- | --- | --- | --- |
| 1 | C | C | C | C |
| 1-A | C | C | C | C |
| 1-B | C | C | C | C |
| 2 | C | C | C | C |
| 2-A | C | C | C | C |
| 2-B | C | C | C | C |
| 8 | B | C | C | B |
| 9 | C | C | C | C |
| 10 | B | B | B | B |
| 12 | B | C | C | B |
| 12-A | C | C | C | C |
| 12-B | C | C | C | C |
| 13 | B | C | C | B |
| 13-A | B | C | C | B |
| 13-B | B | C | C | B |
| 14 | B | C | C | C |
| 16 | C | B | C | C |
| Itraconazole | A | A | A | A |

Data in the above table reveal that compared with clinically applied antifungal drug Itraconazole, compounds specified in the present invention have stronger in vitro minimum inhibitory concentration, which is very significant for developing new antifungal drugs.

The invention claimed is:

1. A compound of formula (1) or an optical isomer, a crystal form, a pharmaceutically acceptable salt, hydrate or solvate thereof:

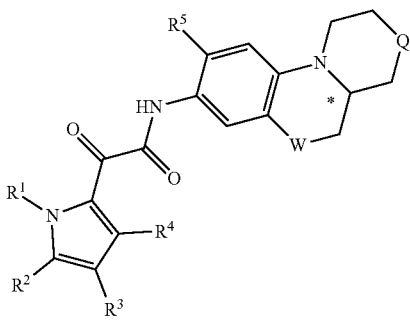

(1)

wherein,
"*" is a chiral center;
$R^1$ is H, C1-C6 alkyl, (C1-C3)alkoxyl-(C2-C3)alkyl-, (C3-C6)cycloalkyl-(C1-C3)alkyl-, C3-C6 cycloalkyl, or halogenated C1-C6 alkyl;
$R^2$ is H, C1-C3 alkyl, or C3-C6 cycloalkyl;
$R^3$ is H or halogen;
$R^4$ is H, halogen, C1-C3 alkyl, C3-C6 cycloalkyl, aryl, or heteroaryl, wherein the aryl or the heteroaryl are optionally substituted by 1-3 of the following substituents: halogen, C1-C3 alkyl, C3-C6 cycloalkyl, C1-C3 alkoxyl, halogenated C1-C3 alkyl, or halogenated C1-C3 alkoxyl; when substituted by several substituents, the substituents may be the same or different;
$R^5$ is H, Me, OMe, or halogen;
W is —O— or —$NR^6$—, wherein $R^6$ is H, C1-C3 alkyl, or C3-C6 cycloalkyl;
Q is —O— or —$NR^7$—, wherein $R^7$ is H, C1-C3 alkyl, $^t$-Bu, $^i$-Bu,

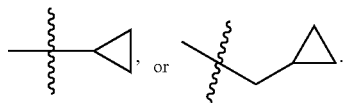

C3-C6 cycloalkyl, (C3-C6)cycloalkyl-(C1-C3)alkyl-, heterocyclic alkyl, aryl, or heteroaryl, wherein the aryl or the heteroaryl are optionally substituted by 1-3 of the following substituents: halogen, C1-C3 alkyl, C3-C6 cycloalkyl, C1-C3 alkoxyl, halogenated C1-C3 alkyl, or halogenated C1-C3 alkoxyl; when substituted by several substituents, the substituents may be the same or different.

2. The compound according to claim 1, wherein in the Formula (1), $R^1$ is H, Me, Et, $^n$-Pr, $^i$-Pr, $^t$-Bu, —CH$_2$CH$_2$OMe,

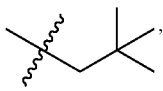

3. The compound according to claim 1, wherein in the Formula (1), $R^2$ is H, Me, Et, or

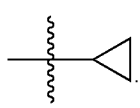

4. The compound according to claim 1, wherein in the Formula (1), $R^3$ is H or F.

5. The compound according to claim 1, wherein in the Formula (1), $R^4$ is

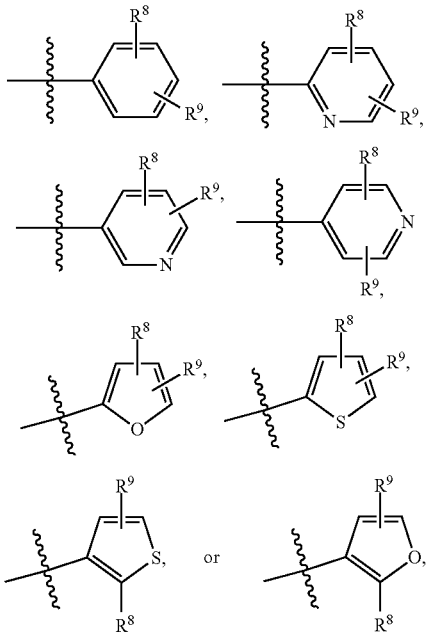

and $R^8$ and $R^9$ are independently H, halogen, C1-C3 alkyl, C3-C6 cycloalkyl, C1-C3 alkoxyl, halogenated C1-C3 alkyl, or halogenated C1-C3 alkoxyl.

6. The compound according to claim 1, wherein in the Formula (1), $R^5$ is H, F, Cl, or OMe.

7. The compound according to claim 1, wherein in the Formula (1), W is —O— or —NMe-.

8. The compound according to claim 1, wherein in the Formula (1), Q is —O— or —$NR^7$—, and $R^7$ is H, Me, Et, $^n$-Pr, $^i$-Pr, $^t$-Bu, $^i$-Bu,

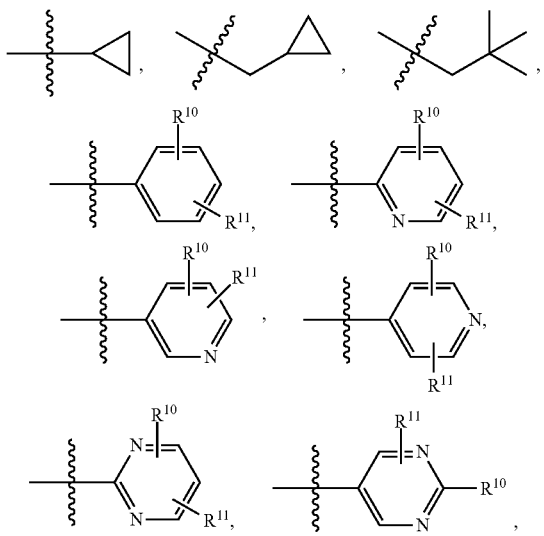

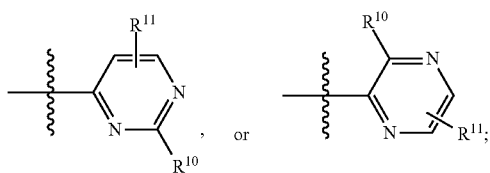
R[10] and R[11] are independently H, halogen, C1-C3 alkyl, C3-C6 cycloalkyl, C1-C3 alkoxyl, halogenated C1-C3 alkyl, or halogenated C1-C3 alkoxyl.
9. The compound according to claim 1, or a pharmaceutically acceptable salt hereof, wherein the compound is:
1
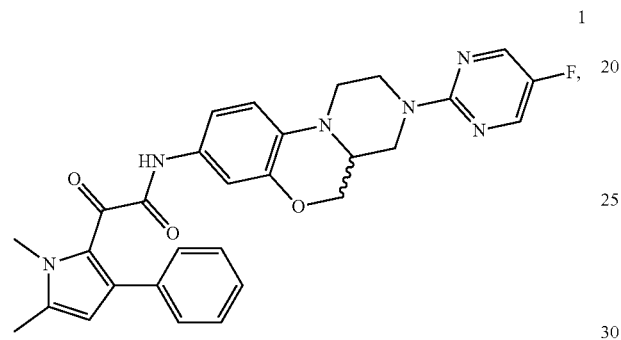
1-A
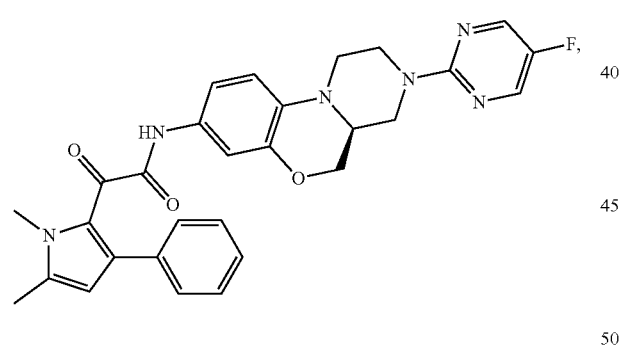
1-B
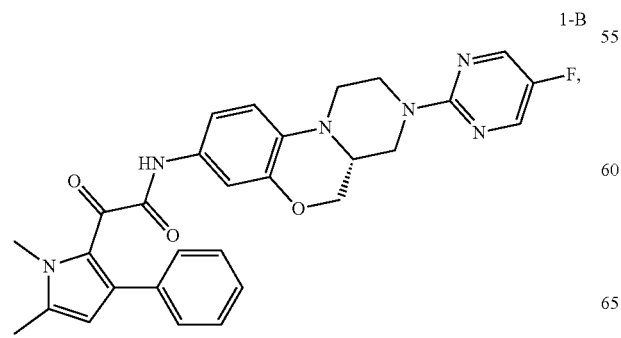
2
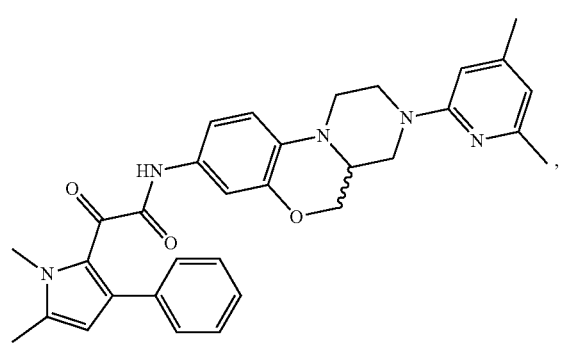
2-A
2-B
3
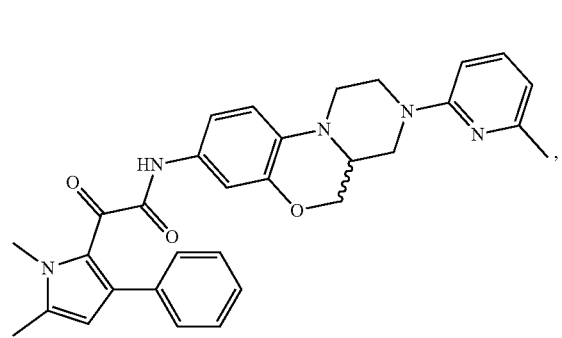

4
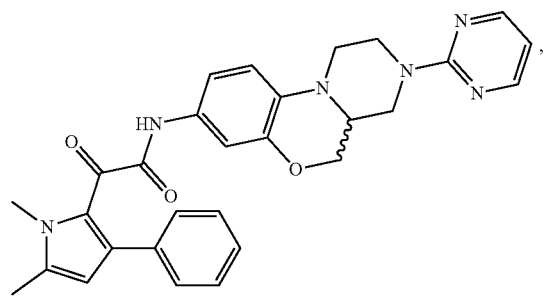
5
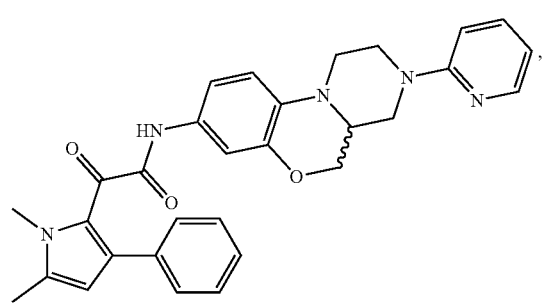
6
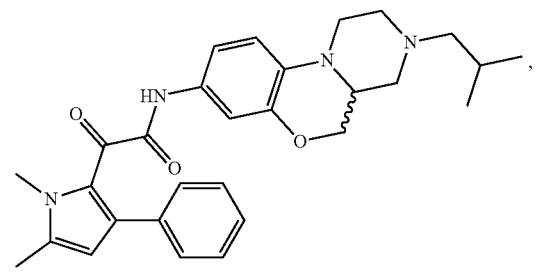
7
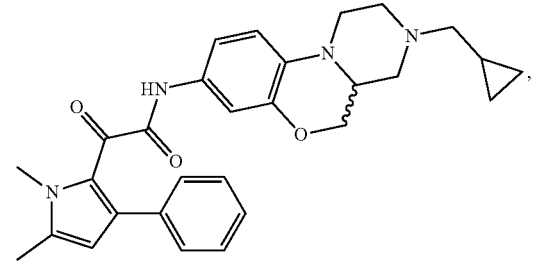
8
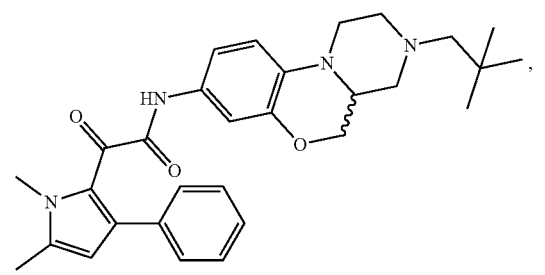
9
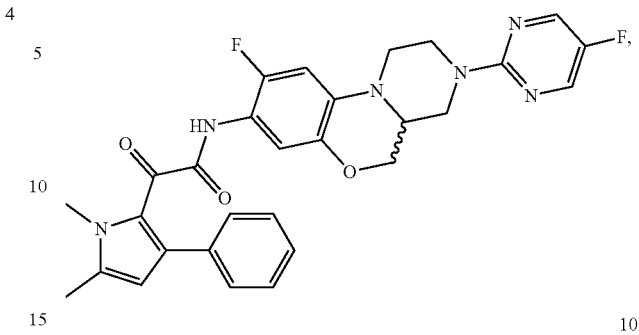
10
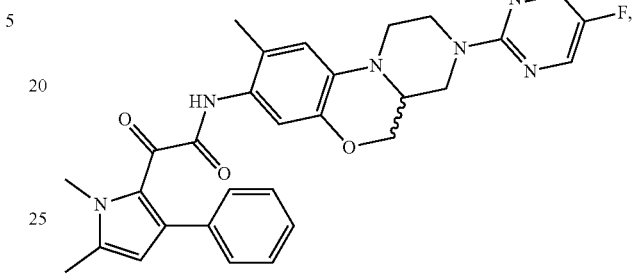
11
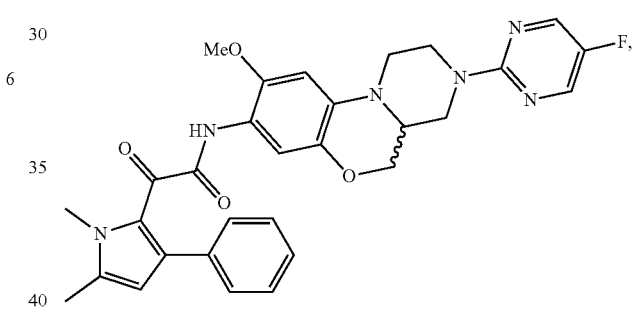
12
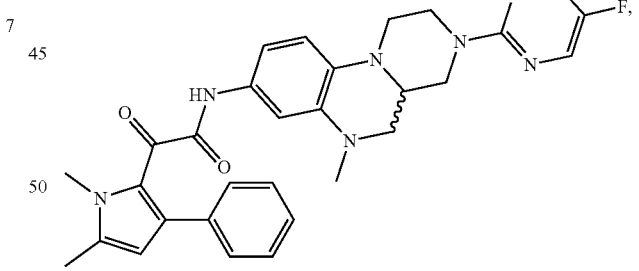
12-A
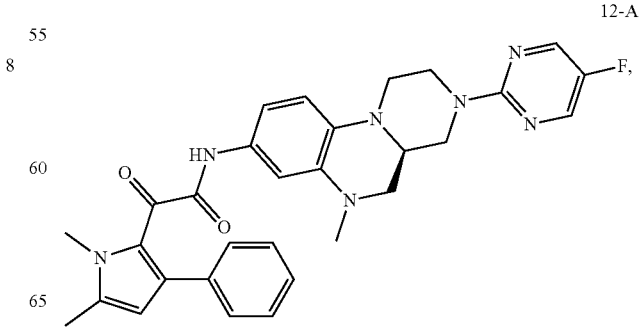

12-B
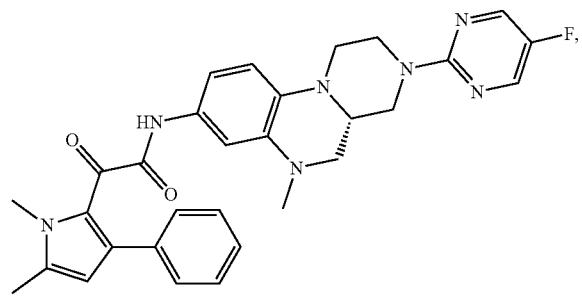
13
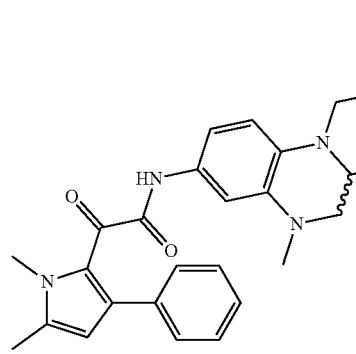
13-A
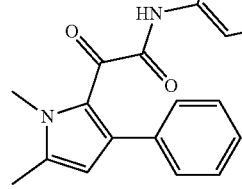
13-B
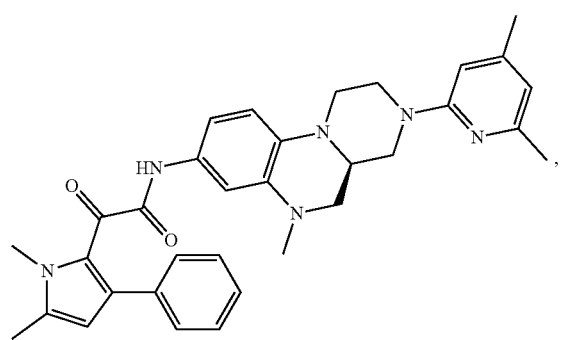
14
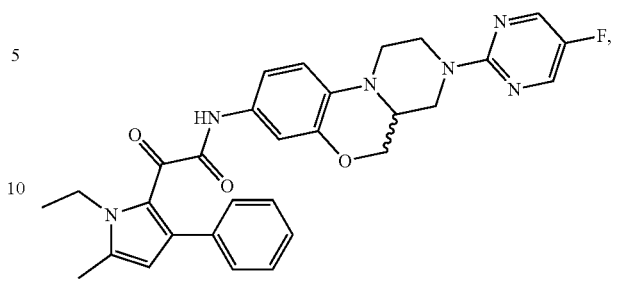
15
16
17
18
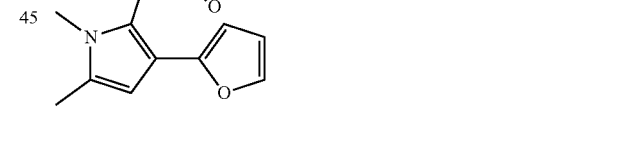
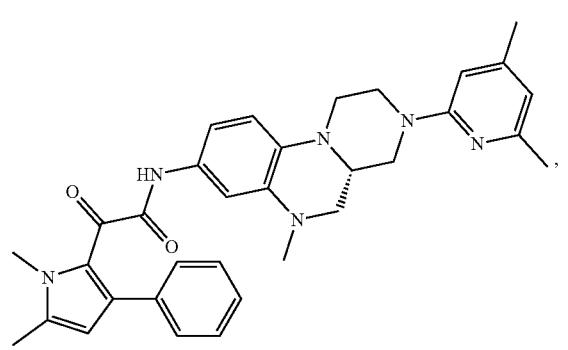
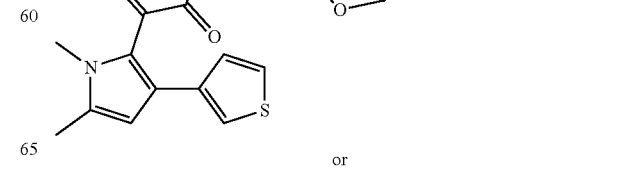
or

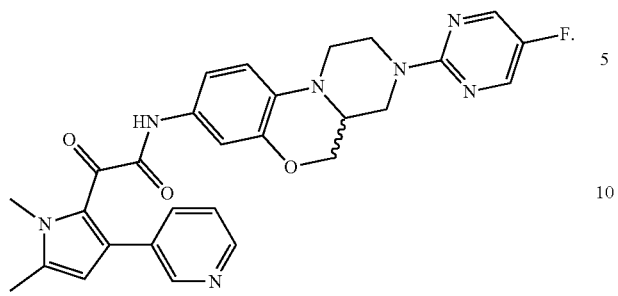
10. A pharmaceutical composition comprising the compound according to claim 1, or an optical isomer, a crystal form, a pharmaceutically acceptable salt, a hydrate, or a solvate thereof as an active ingredient.
* * * * *